(12) United States Patent
Raleigh et al.

(10) Patent No.: US 6,888,899 B2
(45) Date of Patent: May 3, 2005

(54) SPATIO-TEMPORAL PROCESSING FOR COMMUNICATION

(75) Inventors: Gregory G. Raleigh, El Granada, CA (US); Vincent K. Jones, IV, Redwood Shores, CA (US); Michael A. Pollack, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/172,373

(22) Filed: Jun. 13, 2002

(65) Prior Publication Data

US 2003/0072382 A1 Apr. 17, 2003

Related U.S. Application Data

(63) Continuation of application No. 09/435,293, filed on Nov. 5, 1999, now Pat. No. 6,452,981, which is a continuation of application No. 08/921,633, filed on Aug. 27, 1997, now Pat. No. 6,144,711.
(60) Provisional application No. 60/025,227, filed on Aug. 29, 1996, and provisional application No. 60/025,228, filed on Aug. 29, 1996.

(51) Int. Cl.[7] .......................... H04L 27/12; H04L 1/02
(52) U.S. Cl. .................. 375/299; 375/396; 375/347; 375/349; 375/296
(58) Field of Search .................. 375/219, 229, 375/232, 260, 265, 267, 285, 295, 296, 299, 316, 341, 346, 347, 349; 370/203, 210, 242; 455/63, 64, 65; 708/403, 404, 405

(56) References Cited

U.S. PATENT DOCUMENTS 4,337,376 A 6/1982 Gruenberg ............... 179/2 EB
4,710,944 A 12/1987 Nossen .................... 375/40

(Continued)

FOREIGN PATENT DOCUMENTS

| EP | 0253465 | 3/1987 |
|---|---|---|
| EP | 0715477 | 6/1996 |
| FR | 2716055 | 8/1995 |
| WO | WO95/22873 | 8/1995 |
| WO | WO 96/30964 | 10/1996 |
| WO | WO98/09381 | 3/1998 |
| WO | WO98/09395 | 3/1998 |

OTHER PUBLICATIONS

P.A. Voois, "Two–dimensional signal processing for magnetic storage systems," 1993, Ph.D. Thesis, Stanford University, pp. 1–136.

Biglieri et al., "Introduction to trellis coded modulation with applications," 1991, MacMillan Publishing.

(Continued)

*Primary Examiner*—Chieh M. Fan
(74) *Attorney, Agent, or Firm*—Dan Lang; Dov Rosenfeld; Ritter, Lang & Kaplan

(57) ABSTRACT

A space-time signal processing system with advantageously reduced complexity. The system may take advantage of multiple transmitter antenna elements and/or multiple receiver antenna element or multiple polarizations of a single transmitter antenna element and/or single receiver antenna element. The system is not restricted to wireless contexts and may exploit any channel having multiple inputs or multiple outputs and certain other characteristics. Multipath effects in a transmission medium cause a multiplicative increase in capacity.

21 Claims, 26 Drawing Sheets

U.S. PATENT DOCUMENTS

| | | | |
|---|---|---|---|
| 5,134,715 A | | 7/1992 | Parl et al. ..................... 455/64 |
| 5,228,025 A | | 7/1993 | Le Floch et al. ............. 370/20 |
| 5,315,584 A | | 5/1994 | Savary et al. .................. 370/18 |
| 5,345,599 A | | 9/1994 | Paulraj et al. ............. 455/49.1 |
| 5,471,647 A | | 11/1995 | Gerlach et al. ............... 455/63 |
| 5,479,444 A | | 12/1995 | Malkamaki et al. ........ 375/231 |
| 5,479,447 A | | 12/1995 | Chow et al. ................ 375/260 |
| 5,510,799 A | | 4/1996 | Wishart ...................... 342/373 |
| 5,515,378 A | | 5/1996 | Roy, III et al. ............ 370/95.1 |
| 5,528,581 A | | 6/1996 | De Bot ........................ 370/19 |
| 5,537,435 A | | 7/1996 | Carney et al. .............. 375/219 |
| 5,548,819 A | | 8/1996 | Robb .......................... 455/59 |
| 5,566,209 A | | 10/1996 | Forssen et al. ............. 375/262 |
| 5,592,490 A | * | 1/1997 | Barratt et al. ............... 370/310 |
| 5,610,908 A | | 3/1997 | Shelswell et al. ........... 370/210 |
| 5,633,881 A | * | 5/1997 | Zehavi et al. ............... 714/756 |
| 5,634,199 A | | 5/1997 | Gerlach et al. ............... 455/63 |
| 5,642,353 A | | 6/1997 | Roy, III et al. ............. 370/329 |
| 5,649,287 A | | 7/1997 | Forssen et al. ............. 370/312 |
| 5,691,727 A | | 11/1997 | Cyzs ........................... 342/361 |
| 5,703,903 A | * | 12/1997 | Blanchard et al. .......... 375/232 |
| 5,752,173 A | * | 5/1998 | Tsujimoto .................... 455/137 |
| 5,809,019 A | | 9/1998 | Ichihara et al. ............. 370/334 |
| 5,832,389 A | * | 11/1998 | Dent ....................... 455/562.1 |
| 5,886,988 A | | 3/1999 | Yun et al. .................... 370/329 |
| 5,905,721 A | | 5/1999 | Liu et al. ..................... 370/342 |
| 5,905,742 A | * | 5/1999 | Chennakeshu et al. ..... 714/792 |
| 5,966,094 A | | 10/1999 | Ward et al. ................. 342/373 |
| 6,097,771 A | | 8/2000 | Foschini ..................... 375/346 |
| 6,256,290 B1 | * | 7/2001 | Ramesh ...................... 370/204 |

OTHER PUBLICATIONS

P. Lancaster, "Theory of matrices," 1969, Academic Press, Chap. 2.

Raleigh et al., "Spatio–temporal coding for wireless communications," 1996, IEEE Transactions on Communications.

Justin C.I. Chuang, "Burst coherent demodulation with combined symbol timing, frequency offset estimation and diversity selection," 1991, IEEE, vol. 39, No. 7, pp. 1157–1164.

Leonard, J. Cimini, Jr., "Analysis and simulation of a digital mobile channel using orthogonal frequency division multiplexing," 1985, IEEE, vol. 33, No. 7, pp. 665–675.

Kouichi Ohkawa, "Performance of multicarrier–trellis–coded 8PSK using frequency hopping in rayleigh fading channels," 1994, Not. Conference Publication—Institution of Engineers, vol. 1, pp. 145–149.

Essam S. Sourour, "Performance of orthogonal multicarrier CDMA in a multipath fading channel," 1996, IEEE, vol. 44, No. 3, pp. 356–367.

Hirofumi Ichikawa, "Frequency diversity effects in multi-carrier digital radio systems," 1991, Electronics and Communications in Japan, Prt. 1, vol. 74, No. 8, pp. 70–77.

J. L. Holsinger, "Digital communications over fixed time-–continuous channels with memory, with special application to telephone channels," 1964, MIT Research Laboratory Electronics Report, vol. 430.

Cover et al., "Elements of information theory," 1991, New York: John Wiley, Chp. 2, pps. 12–49, Chp. 8 pps. 183–223, and Chap. 10 pps. 239–265.

Ruiz et al., "Discrete multiple tone modulation with coset coding for the spectrally shaped channel," 1992, IEEE Trans. Commun, vol. 40(6), pps. 1012–1029.

R.M. Gray, "On the asymptotic eigenvalue distribution of toeplitz matrices," 1972, IEEE Trans. Information Theory, vol. 18, pps. 725–730.

G. Forney, "Maximum–likelihood sequence estimation of digital sequences in the presence of intersymbol interference," 1972, IEEE Trans. Inform. Theory, vol. IT–18(3), pps. 363–378.

Seshadri N. et al., "Space–Time Codes for Wireless Communication: Code Construction," IEEE Vehicular Technology Conference, US NY IEEE vol. Conf. 47 May 4, 1997 pp. 637–641.

L. Vandendorpe, "Analysis of residual interference after MSE linear equalization of multitone spread spectrum signals," IEEE International Conference on Communications, Jun. 18–22, 1995, pp. 1673–1677.

L. Vandendorpe, "Performance of Fractionally Spaced Linear and Decision–Feedback Equalizers For Multitone Systems," IEEE Globecom, London, Nov. 18–22, 1996, pp. 36–40.

L. Vandendorpe, "Reduced Complexity Fractionally Spaced Mimo Equalizers For Multitone Systems Without Guard Time," IEEE International Conference On Personal Wireless Communications Proceedings & Exhibition–Future Access, New Delhi, India Feb. 19–21, 1996, pp. 323–328.

L. Vandendorpe, "MIMO DFE Equalization for multitone DSS/SS Systems, over Multipath Channels," IEEE Journal on Selected Areas in Communications, vol. 14, No. 3, Apr. 1996, pp. 502–511.

Gerard J. Foschini, "Layered Space–Time Architecture for Wireless Communication in a Fading Environment When Using Multi–Element Antennas," Bell Labs Technical Journal, Autumn 1996, pp. 41–58.

M. Sawahashi, "Multicarrier 16QAM transmission with diversity reception," 1996, Electronics Letters, vol. 32, No. 6, pps. 522–523.

Flavio Daffara, "A new frequency detector for orthogonal multicarrier transmission techniques," IEEE 45th Vehicular Technology Conference, pps. 804–809.

C.E. Shannon, "Mathematical theory of communications: Part I and Part II," 1948, The Bell System Journal, pps. 379–423, 623–656.

Fectel et al., "Optional feedforward estimation of frequency–selective fading radio channels using statistical channel information," 1992, in Proc. SUPERCOMM/ICC '92, vol. 2.

Brandenburg et al., "Capacity of the gaussian channel with memory: the multivariate case," 1993, Bell System Technical Jounral, vol. 53, pps. 745–78.

Cheng et al., "Gaussian multiaccess channels with ISI: Capacity region and multiuser water–filling," 1993, IEEE Trans. Inform. Theory, vol. 39(3), pps. 773–785.

J. Salz, "Digital transmission over cross–coupled linear channels," 1985, AT&T Tech. Journal, vol. 64(6), pps. 1147–1159.

A. Duel–Hallen, "Equalizers for multiple input multiple output channels and PAM systems with cyclostationary input sequences," 1992, IEEE Journal of Sel. Areas in Comm., vol. 10(3), pps. 630–639.

Yang et al., "On joint transmitter and receiver optimization for multiple–input multiple–output (MIMO) transmision systems," 1994, IEEE Trans. Commun., Col. 42–(12), pps. 3221–3231.

Yang et al., "Joint transmitter–receiver optimization for multi–input multi–output systems with decision feedback," 1994, IEEE Trans. Information Theory, vol. 40(5), pps. 1334–1347.

Cox et al., "Distributions of multipath delay spread and average excess delay for 910 Mhz urban mobile radio paths," 1975, IEEE Trans. Antennas and Prop., vol. Ap–23, pps. 206–213.

Weinstein et al., "Data transmission by frequency–division multiplexing using the discrete fourier transform," 1971, IEEE transactions on communications, vol. 19(5), pps. 628–634.

R.J. Muirhead, "Aspects of multivariate statistical theory," 1982, New York: John Wiley, Chps. 4 and 5.

W.C. Jakes, "Microwave mobile communications," 1974, New York: John Wiley, Chps. 1, 5, and 6.

Braun et al., "A physical mobile radio channel model," 1991, IEEE Vehicular Technolpgy, vol. 40, pps. 472–482.

Bryson et al., "Applied optimal control," 1968, Washington D.C. Hemisphere Publishing, pps. 24–29.

Sanjay Kasturia et al., "Vector coding for partial–response channels," Jul. 1990, IEEE Transactions on Information Theory, vol. 36, No. 4 pp. 741–762.

Mikael Gudmundson, "Spectral efficiency of a multitone frequency hopping system for personal communication systems," 1994, IEEE Vehicular Technology Conferences, prt. 3, vol. 3, p. 1650–1654.

T. Aron Gulliver, "Order statistics diversity combing in worst case noise and multitone jamming," 1995, IEEE Vehicular Technology Conference, vol. 2, pp. 804–809.

R. Monnier, "Digital television broadcasting with high spectral efficiency," 1992, IEEE Conference Pub. No. 358, pps. 380–384.

Enrico Del Re, "Digital Multicarrier demodulator for regenerative communication satellites," 1988, Alta Frequenza, vol. 57, No. 10, pps. 545–559.

Youko Omori, "Multicarrier 16QAM system in land mobile communications," 1994, IEICE Transactions on Communications, vol. E77–B, No. 5, pps. 545–559.

Fulvio Ananasso, "Clock synchronous multicarrier demodulator for multi–frequency TDMA communications satellites," 1990, IEEE International Conference on Communications, Col. 3, pps. 1059–1063.

M. Friese, "Multicarrier modulation with low peak–to–average power ratio," 1996, Electronics Letters, vol. 32, No. 8, pps. 713–714.

Adil Benyassine, "Optimal subchannel structuring and basis selection for discrete multicarrier modulation," 1995, IEEE Communications Theory Mini–Conference Proceedings, CTMC, pps. 97–101.

* cited by examiner

SPATIO-TEMPORAL PROCESSING FOR COMMUNICATION

STATEMENT OF RELATED APPLICATIONS

The present application is a continuation of and claims the benefit of priority from U.S. patent application Ser. No. 09/435,293; filed Nov. 5, 1999, now U.S. Pat. No. 6,452,981 which is a continuation of U.S. patent application Ser. No. 08/921,633; filed Aug. 27, 1997, now U.S. Pat. No. 6,144,711, and provisional applications: SPATIO-TEMPORAL CODING FOR WIRELESS COMMUNICATION, U.S. Prov. App. No. 60/025,227 and SPATIO-TEMPORAL CODING TECHNIQUES FOR RAPIDLY FADING WIRELESS CHANNELS, U.S. Prov. App. No. 60/025,228, both filed on Aug. 29, 1996. The contents of both provisional applications are herein incorporated by reference in their entirety for all purposes.

BACKGROUND OF THE INVENTION

The present invention relates to digital communication and more particularly to a space-time communication system.

The ability to communicate through wireless media is made difficult by the inherent characteristics of how transmitted signals propagate through the environment. A communication signal transmitted through a transmitter antenna element travels along multiple paths to the receiving antenna element. Depending on many factors including the signal frequency and the terrain, the paths along which the signal travels will exhibit different attenuation and propagation delays. This results in a communication channel which exhibits fading and delay spread.

It is well known that adaptive spatial processing using multiple antenna arrays increases the communications quality of wireless systems. Adaptive array processing is known to improve bit error rate, data rate, or spectral efficiency in a wireless communication system. The prior art provides for methods involving some form of space-time signal processing at either the input to the channel, the output to the channel, or both. The space-time processing step is typically accomplished using an equalization structure wherein the time domain equalizer tap settings for a multitude of antennas are simultaneously optimized. This so-called "space-time equalization" leads to high signal processing complexity if the delay spread of the equivalent digital channel is substantial.

There is prior art teaching the use of conventional antenna beams or polarizations to create two or more spatially isolated communication channels between a transmitter and a receiver, but only under certain favorable conditions. The radiation pattern cross talk between different physical transmit and receive antenna pairs must provide sufficient spatial isolation to create two or more substantially independent communication channels. This can lead to stringent manufacturing and performance requirements on the physical antenna arrays as well as the receiver and transmitter electronics. In addition, when large objects in the wireless propagation channel cause multipath reflections, the spatial isolation provided by the prior art between any two spatial subchannels can be severely degraded, thus reducing communication quality.

What is needed is a system for more effectively taking advantage of multiple transmitter antennas and/or multiple receiver antennas to ameliorate the deleterious effects of the inherent characteristics of wireless media.

SUMMARY OF THE INVENTION

The present invention provides a space-time signal processing system with advantageously reduced complexity. The system may take advantage of multiple transmitter antenna elements and/or multiple receiver antenna elements, or multiple polarizations of a single transmitter antenna element and/or single receiver antenna element. The system is not system. The prior art provides for methods involving some form of space-time signal processing at either the input to the channel, the output to the channel, or both. The space-time processing step is typically accomplished using an equalization structure wherein the time domain equalizer tap settings for a multitude of antennas are simultaneously optimized. This so-called "space-time equalizaion" leads to high signal processing complexity if the delay spread of the equivalent digital channel is substantial.

There is prior art teaching the use of conventional antenna beams or polarizations to create two or more spatially isolated communication channels between a transmitter and a receiver, but only under certain favorable conditions. The radiation pattern cross talk between different physical transmit and receive antenna pairs must provide sufficient spatial isolation to create two or more substantially independent communication channels. This can lead to stringent manufacturing and performance requirements on the physical antenna arrays as well as the receiver and transmitter electronics. In addition, when large objects in the wireless propagation channel cause multipath reflections, the spatial isolation provided by the prior art between any two spatial subchannels can be severely degraded, thus reducing communication quality.

What is needed is a system for more effectively taking advantage of multiple transmitter antennas and/or multiple receiver antennas to ameliorate the deleterious effects of the inherent characteristics of wireless media.

SUMMARY OF THE INVENTION

The present invention provides a space-time signal processing system with advantageously reduced complexity. The system may take advantage of multiple transmitter antenna elements and/or multiple receiver antenna elements, or multiple polarizations of a single transmitter antenna element and/or single receiver antenna element. The system is not restricted to wireless contexts and may exploit any channel having multiple inputs or multiple outputs and certain other characteristics. In certain embodiments, multipath effects in a transmission medium cause a multiplicative increase in capacity.

One wireless embodiment operates with an efficient combination of a substantially orthogonalizing procedure (SOP) in conjunction with a plurality of transmitter antenna elements with one receiver antenna element, or a plurality of receiver antenna elements with one transmit antenna element, or a pluraltiy of both transmitter and receiver antenna elements. The SOP decomposes the time domain space-time communication channel that may have inter symbol interference (ISI) into a set of parallel, space-frequency, SOP bins wherein the ISI is substantially reduced and the signal received at a receiver in one bin of the SOP is substantially independent of the signal received in any other bin of the SOP. A major benefit achieved thereby is that the decomposition of the ISI-rich space time channel into substantially independent SOP bins makes it computationally efficient to implement various advantageous spatial processing techniques embodied herein. The efficiency benefit is due to the fact that the total signal processing complexity required to optimize performance in all of the SOP bins is often significantly lower than the processing complexity required to jointly optimize multiple time domain equalizers.

Another benefit is that in many types of wireless channels where the rank of the matrix channel that exist between the transmitter and the receiver within each SOP bin is greater than one, the combination of an SOP with spatial processing can be used to efficiently provide multiple data communication subchannels within each SOP bin. This has the desirable effect of essentially multiplying the spectral data efficiency of the wireless system. A further feature is the use of spatial processing techniques within each transmitter SOP bin to reduce radiated interference to unintentional receivers. A still further feature is the ability to perform spatial processing within each receiver SOP bin to reduce the deleterious effects of interference from unintentional transmitters.

One advantageous specific embodiment for the SOP is to transmit with IFFT basis functions and receive with FFT basis functions. This particular SOP is commonly referred to as discrete orthogonal frequency division multiplexing (OFDM), and each SOP bin is thus associated with a frequency bin. This embodiment enhances OFDM with the addition of efficient spatial processing techniques.

According to the present invention, space-frequency processing may adaptively create substantially independent spatial subchannels within each SOP bin even in the presence of significant cross talk interference between two or more physical transmit and receive antenna pairs. A further advantage is that the space-frequency processing can advantageously adapt to cross talk interference between the physical antenna pairs even if this cross-talk is frequency dependent, or time varying, or both. Thus, the present invention may provide two or more substantially independent communication channels even in the presence of severe multipath and relatively poor physical antenna radiation pattern performance.

A further understanding of the nature and advantages of the inventions herein may be realized by reference to the remaining portions of the specification and the attached drawings.

DESCRIPTION OF SPECIFIC EMBODIMENTS

Definitions

Figure 1:
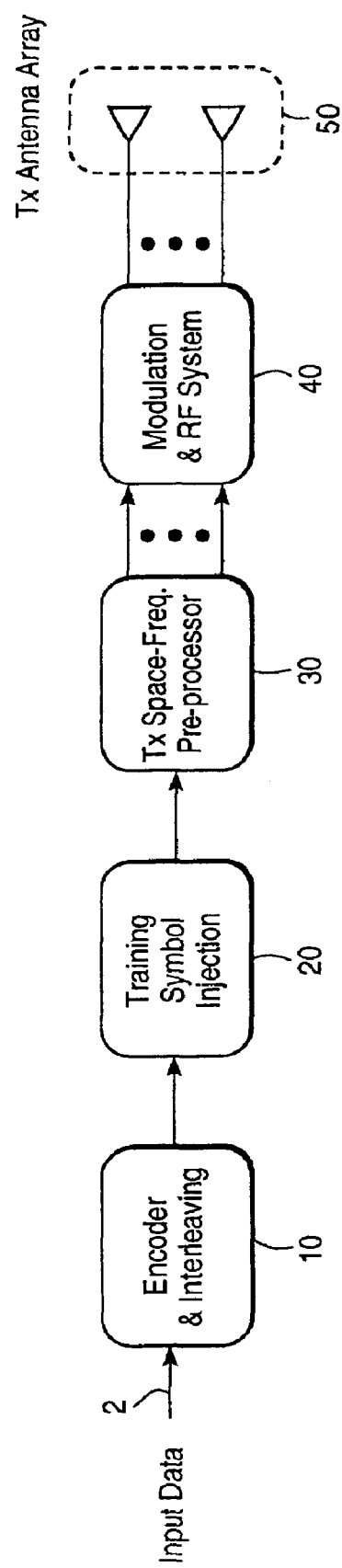
FIG. 1 depicts a transmitter system according to one embodiment of the present invention.

A "channel" refers to the input symbol to output symbol relationship for a communication system. A "vector channel" refers to a channel with a single input and multiple outputs (SIMO), or multiple inputs and a single output (MISO). Each $h_j$ entry in the vector channel h describes one of the complex path gains present in the channel. A "matrix channel" refers to a channel with multiple inputs and multiple outputs (MIMO). Each entry $H_{i,j}$ in the matrix H describes the complex path gain from input j to output i. A "space time channel" refers to the input to output relationship of a MIMO matrix channel, or a SIMO or MISO vector channel, that occurs when multipath signal propagation is present so that the channel contains delay elements that produce inter-symbol interference (ISI) as explained below.

A "spatial direction" is a one dimensional subspace within a matrix or vector communication channel. Spatial directions need not be orthogonal. A spatial direction is typically characterized by a complex input vector and a complex output vector used to weight transmitted or received signals as explained herein.

A "sub-channel" is a combination of a bin in a substantially orthogonalizing procedure (SOP) as explained below and a spatial direction within that bin. A group of spatial subchannels within an SOP bin may or may not be orthogonal.

An "orthogonal dimension" is one member in a set of substantially orthogonal spatial directions.

A channel "subspace" is a characterization of the complex m-space direction occupied by one or more m-dimensional vectors. The subspace characterization can be based on the instantaneous or average behavior of the vectors. A subspace is often characterized by a vector-subspace of a covariance matrix. The covariance matrix is typically a time or frequency averaged outer product of a matrix or vector quantity. The covariance matrix characterizes a collection of average channel directions and the associated average strength for each direction.

A "two norm" metric for a vector is the sum of the squared absolute values for the elements of the vector.

A "Euclidean metric" is a two norm metric.

"Intersymbol interference" (ISI) refers to the self interference that occurs between the delayed and scaled versions of one time domain symbol and subsequent symbols received at the output of a delay spread communication channel. The channel delay spread is caused by the difference in propagation delay between the various multipath components combined with the time domain response of the RF and digital filter elements.

A "substantially orthogonalizing procedure" (SOP) is a procedure that plays a part in transforming a time domain sequence into a parallel set of substantially orthogonal bins, wherein the signals in one bin do not substantially interfere with the signals from other bins. Typically, the transformation from a time domain sequence to a set of substantially orthogonal bins requires a transmitter SOP with a set of input bins, and a receiver SOP with a set of output bins.

"Convolutional bit mapped QAM" (CBM-QAM) is the coding system that results when the output of a convolutional encoder are grouped and mapped to QAM constellation points.

Fading "structure" occurs when the fading behavior of one or more entries in a channel matrix within an SOP bin is correlated across time, or frequency, or both. This structure can be exploited using advantageously designed estimation filters to improve channel estimation accuracy given multiple frequency samples of the channel matrix entries, or multiple time samples, or both.

A "maximum likelihood sequence detector" is a sequence estimator that computes the most likely transmitted code sequence, from a set of possible sequences, by minimizing a maximum likelihood cost function.

An "antenna element" is a physical radiator used to transmit or receive radio frequency signals. An antenna element does not involve any electronics processing components. A single radiator with two polarization feeds is viewed as two antenna elements.

An "antenna array" is a collection of antenna elements.

A "burst" is a group of transmitted or received communication symbols.

Background Material

The disclosure herein assumes a background in digital communication and linear algebra. The following references are incorporated herein by reference.

Wozencraft & Jacobs, Principles of Communication Engineering (1965).
Haykin, Adaptive Filter Theory, $2^{nd}$ Ed. (1991).
Stang, Linear Algebra, $3^{rd}$ Ed. (1988).
Jakes, Microwave Mobile Communication (1974).
Proakis, Digital Communications (1995).

Transmitter Overview

FIG. 1 depicts a transmitter system in accordance with one embodiment of the present invention. Typically an information signal input 2 includes a digital bit sequence, although other forms of digital data or analog data are possible. In the case of digital data, the input data sequence is first fed into an Encoder and Interleaving apparatus 10 where the data is encoded into a symbol stream. The symbol stream is typically a sequence of complex digitized values that represent members of a finite set. Each symbol can be a one dimensional value, or a multidimensional value. An exemplary one dimensional symbol set is a PAM constellation. Note that in this discussion, it is understood that a symbol with in-phase and quadrature components, is considered to be a complex one dimensional symbol, so that the QAM constellation is also viewed as a set of one dimensional symbols. An example multidimensional symbol set is a sequential grouping of QAM constellation members.

The purpose of the encoding process is to improve the bit error rate of the transmitted signal by introducing some form of information redundancy into the transmitted data stream. Useful encoding techniques can involve combinations of a number of well known techniques such as convolutional encoding with bit mapping to symbols, trellis encoding, block coding such as cyclic redundancy check or Reed Solomon coding with bit mapping or Automatic Repeat Queing. An interleaver is often advantageous for distributing the transmitted information among the various subchannels available for transmission. This interleaving distributes the effects of channel fading and interference so that long sequences of symbols with poor quality are not grouped closely together in the SOP bin sequence that is fed into the receiver decoder. In many applications, it is advantageous to perform a power and bit-loading optimization wherein the number of bits that are mapped to a given encoder symbol, and the signal power assigned to that symbol, are determined based upon the measured communication quality of the space-frequency information subchannel that carries the symbol stream.

After the digital data is encoded into a sequence of symbols, a Training Symbol Injection block 20 may be used to place a set of known training symbol values in the transmitter symbol stream. The purpose of the training symbols is to provide a known input within a portion of the transmitted symbol stream so that a receiver may estimate the communication channel parameters. The channel estimate is used to aid in demodulation and decoding of the data sequence. The training symbols may be injected periodically in time, periodically in frequency, or both. It will be obvious to one skilled in the art that blind adaptive spatial processing techniques can be utilized within each SOP bin at the receiver as an alternative to training with known symbols. In such blind detection implementations, Training Symbol Injection block 20 is unnecessary.

Figure 2:
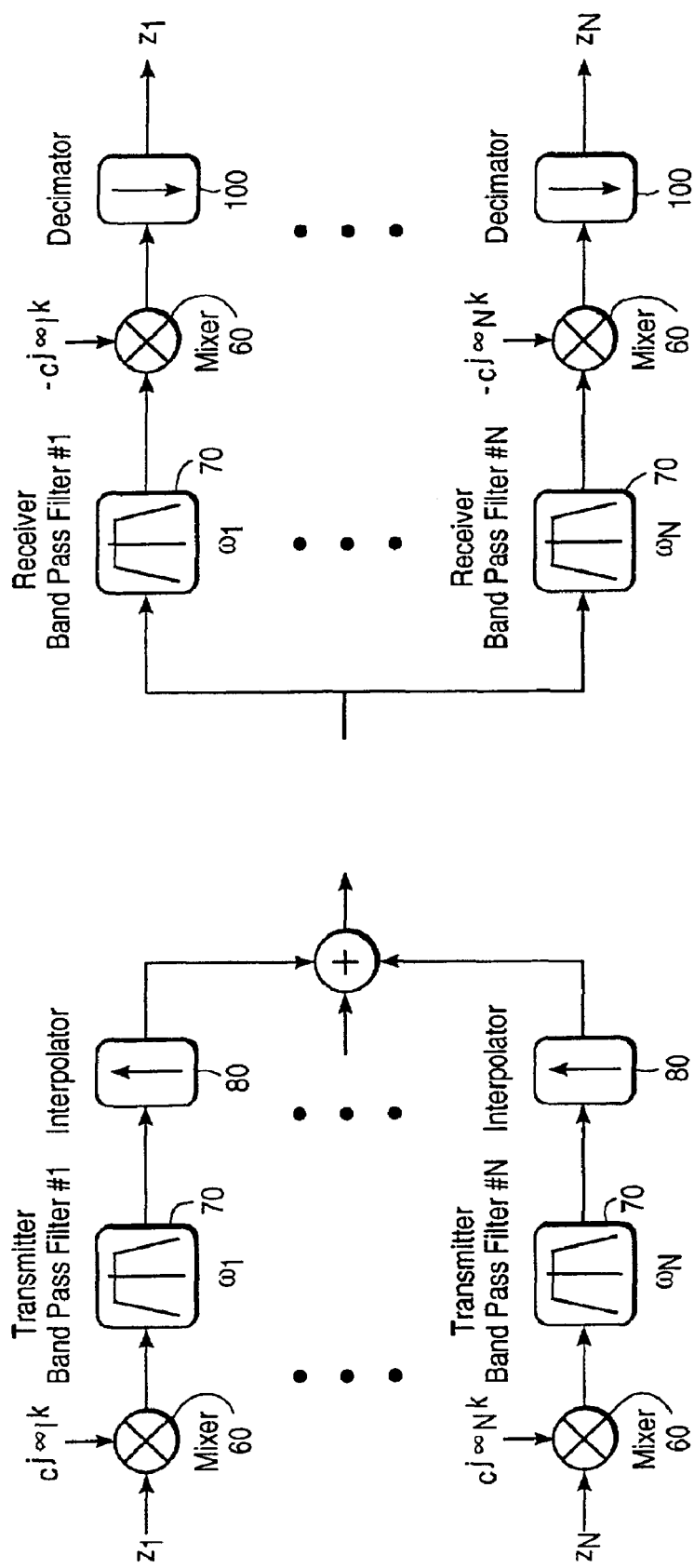
FIG. 2 depicts a particular substantial orthogonalizing procedure (SOP) useful in one embodiment of the present invention.

The data plus training symbol stream is then fed into a Transmitter Space-Frequency Pre-Processor (TSFP) block 30. The TSFP block 30 performs two sets of advantageous processing steps on the symbol stream before transmission. One processing step accomplished within the TSFP is the transmitter portion of a substantially orthogonalizing procedure (SOP). When the transmitter portion of the SOP is combined with the receiver portion of the SOP, a set of parallel bins are created in such a manner that information transmitted within one bin does not substantially interfere with information transmitted from another bin after the receive portion of the SOP is completed. One preferred SOP pair is the inverse fast Fourier transform (IFFT) at the transmitter combined with the FFT at the receiver. Another advantageous SOP pair embodiment is a bank of multiple filter and frequency converter pairs (multi-band SOP) with one filter bank located at the transmitter and one filter bank located at the receiver as depicted in FIG. 2. Several other example SOPs including the Hilbert transform pair and generalized wavelet transform pairs will be obvious to one skilled in the art. The other processing step accomplished in the TSFP is spatial processing. The spatial processing step typically multiplies one or more symbols that are destined for transmission in a given SOP bin with one or more spatial vector weights. For convenience in the following discussion, the collection of spatial processing weights applied to the signals transmitted or received in a given SOP bin are sometimes referred to as a matrix. The spatial vector weights are optimized to obtain various desirable performance enhancements.

FIG. 2 depicts a digital baseband filter bank at the receiver and a filter bank located at the transmitter. Each filter of the transmitter filter bank includes a mixer (frequency converter) 60, a bandpass filter 70 and an interpolator 80. Each filter of the receiver filter bank includes a bandpass filter 90, a mixer 60, and a decimator 100.

One transmitter embodiment optimizes the transmitter spatial vector weights so that the multiple subchannels in a given SOP bin can be converted at the receiver into substantially independent received spatial subchannels wherein symbols from one subchannel do not substantially interfere with symbols from another subchannel. Another embodiment optimizes the transmitter spatial vector weight to improve the received power of one or more spatial subchannels within each SOP bin, or to improve the average power of several spatial subchannels within several SOP bins. A further embodiment optimizes the transmitter spatial vector weights within each SOP bin to simultaneously increase the power delivered to the desired receiver within one or more spatial subchannels while reducing interference radiated to unintended receivers. A yet further embodiment spatial processes one or more symbols within each SOP bin by multiplying each symbol with a transmitter weight vector that is fixed for all SOP bins, with the weight vectors optimized to increase the time or frequency average power delivered to one or more desired receiver spatial subchanels, and possibly reduce the time or frequency averaged interference radiated to unintended receivers. This last embodiment is particularly useful in FDD systems where multipath fading makes it impossible to estimate the forward channel from reverse channel data, but where the average forward channel subspaces are substantially similar to the average reverse channel subspaces. Another embodiment teaches simply routing each symbol from the encoder to one antenna element in each SOP bin without any weighting. Other useful embodiments are discussed herein, and many others useful combinations of spatial processing with an SOP will become obvious to one skilled in the art. It is understood that one or more digital filters are typically used in TSFP 30 to shape the transmitted RF signal spectrum.

Once the encoder symbol sequence is processed by TSFP 30, the processed symbol sequence includes a parallel set of digital time domain signal sequences. Each of these time domain signal sequences is fed into one input of a Modulation and RF System block 40. Modulation and RF System block 40 includes a set of independent RF upconverter chains that frequency convert the digital baseband signal sequence up to the RF carrier frequency. This is accomplished using apparatus that includes digital to analog converters, RF mixer apparatus, and frequency synthesizer apparatus. The details of these elements of the invention are well known and will not be discussed here.

The final step in the transmission process is to radiate the transmitted signal using a Transmit Antenna Array 50. The antenna arrays can be constructed from one or more co-polarized radiating elements or there may be multiple polarizations. If there is multipath signal propagation present in the radio link, or if there are multiple polarizations in the antenna arrays, or if at least one of the antenna elements on one side of the link are in a disparate location from the other elements on the same side of the link, then the invention has the advantageous ability to create more than one subchannel within each SOP bin. It is understood that one physical antenna reflector with a feed that has two polarizations is considered as two antenna elements in all that follows. There are no restrictions on the antenna array geometry or the geometry of each radiating element. A transmitter system invention may adapt to provide optimized performance for any arbitrary antenna array.

Receiver Overview

Figure 3:
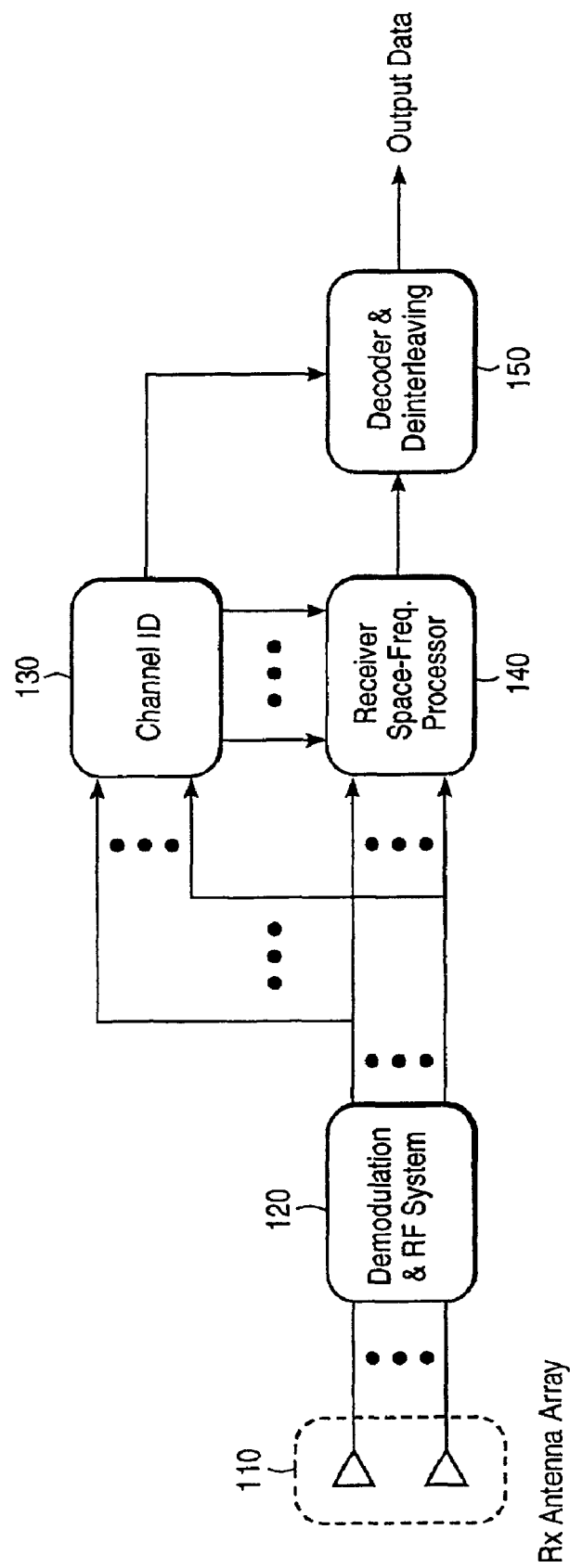
FIG. 3 depicts a receiver system according to one embodiment of the present invention.

FIG. 3 depicts a receiver system according to one embodiment of the present invention. The RF signals from each of the elements of an Antenna Array 110 are downconverted to digital baseband using a Demodulation and RF System 120. Demodulation and RF System 120 includes the RF signal processing apparatus to downconvert the RF carrier signal to a baseband IF where it is then digitized. After the digitizer, a tiring and frequency synchronization apparatus is used to recover the timing of the transmitted digital signal sequence. Several known techniques may be used for the purpose of synchronization and these techniques will not be discussed herein.

In certain embodiments of the invention, after Demodulation and RF System 120, the digital baseband signal is then fed into a Channel ID block 130 and a Receiver Space-Frequency Processor (RSFP) block 140. Within Channel ID block 130, the characteristics of the digital communication channel are estimated. The estimated channel values consist of entries in a matrix for each SOP bin. The matrix contains complex values representing the magnitude of the spatial channel within the SOP bin from one transmit antenna element to one receive antenna element. The matrix channel estimate for each SOP bin is provided to RSFP block 140 and Decoder and Deinterleaving block 150.

Some embodiments of the invention involve improving channel estimation performance by exploiting the structured nature of the frequency domain fading that exists in the matrix channels across SOP bins, exploiting the structure in time domain fading of the matrix channels, or exploiting both the frequency and time domain fading structure that is present. By exploiting the frequency domain fading correlation, the entire set of matrix channels within the SOP bins may be estimated even when training information is transmitted in a subset of the SOP bins. This allows for simultaneous transmission of training and data thus reducing overhead. By exploiting the time domain correlation of the channel fading within each SOP bin, channel estimation accuracy is increased for a given time epoch between training events. This reduces the required frequency of training symbol transmission and thus further reduces training overhead. It is understood that it is also possible to separately exploit time domain and frequency domain correlation, with the most beneficial results occurring if both correlation dimensions are used advantageously. It is to be understood that Channel ID block 130 is shown as a separate function even though it may share some elements with RSFP block 140 or Decoder and Deinterleaver block 150.

RSFP block 140 performs the receiver signal processing that is the dual of the two sets of operations performed in TSFP 30. One of the steps performed in RSFP 140 is the receiver half of the SOP. As discussed above, the receiver half of the SOP completes the transformation between the time domain channel with ISI to the substantially orthogonal set of bins. The second set of signal processing operations that can be performed in the RSFP is spatial processing. In one class of embodiments, the receiver spatial processing step combines the output of the SOP bins using one or more vector weighted inner product steps to form one or more one-dimensional received spatial subchannels within each SOP bin The receiver weight vectors are chosen to optimize an advantageous performance measure. In one embodiment, wherein both the transmitter and receiver have knowledge of the channel state information within each SOP bin, the transmitter spatial weight vectors and the receiver spatial weight vectors are both chosen to optimize performance for a set of multiple substantially independent subchannels within each SOP bin. As discussed above, this significantly increases the spectral efficiency of the system. In another embodiment wherein the transmitter does not have channel state information, the receiver performs the spatial processing required to create multiple substantially independent subchannels within each SOP bin. In a further embodiment wherein the transmitter may or may not have channel state information, the receiver reduces the effects of interference radiated from unintentional transmitters as well as performing the spatial processing required to create multiple substantially independent subchannels within each SOP bin. A yet further embodiment optimizes the receiver spatial vector weights within each SOP bin to simultaneously increase the received power and reduce the detrimental effects of interference received from unintentional transmitters. An additional embodiment involves forming one or more vector weights, that are fixed for all SOP bins, where the vector weights are optimized to simultaneously increase the time or frequency averaged received power for one or more spatial subchannels, while possibly also reducing the time or frequency averaged interference power received from unintended transmitters.

As discussed herein, certain embodiments involve simply passing the vector samples received in each SOP bin to Decoder and Deinterleaving block 150 without performing any spatial processing. It will be obvious to one skilled in the art that other combinations of transmitter spatial weight vector optimization techniques and receiver spatial weight vector optimization techniques can be constructed around the principle concept of spatial processing in combination with an SOP. Other embodiments are discussed herein. One experienced in the art will be able to recognize additional embodiments that involve advantageous combination of an SOP with spatial processing at the receiver or the transmitter. It is understood that one or more digital filters are typically used in RSFP block 1400 to shape the received RF signal spectrum.

The outputs of RSFP block 140 are fed into Decoder and Deinterleaving (DD) block 150. There are two broad exemplary classes of operation for the DD block 150. In the first exemplary broad class of embodiments, DD block 150 decodes a symbol sequence which was encoded and transmitted through a multitude of SOP bins with one or more substantially independent subchannels. The decoder includes the appropriate receiver counterparts for the combination of encoders selected for the transmitter. A preferred embodiment includes a deinterleaver, a trellis decoder or convolutional bit mapping decoder employing a scalar weighted Euclidean maximum likelihood sequence detector, followed by a Reed Solomon decoder, followed by an ARQ system to correct Reed Solomon codeword errors. In the second exemplary broad class of embodiments, DD block 150 decodes a sequence of multidimensional symbols, or groups of adjacent one dimensional symbols, with each multidimensional symbol or group of one dimensional symbols being received in an SOP bin. Typically, the symbol sequences are transmitted without weighting or with weighting that optimizes some measure of average signal quality.

In an alternative embodiment, trellis encoded symbols are grouped and interleaved in a manner such that the symbols transmitted from the antenna elements within a given SOP bin form a vector that is drawn from either a multidimensional QAM encoder output symbol, or a sequence of one dimensional QAM encoder output symbols that have adjacent locations in the pre-interleaved encoder output sequence. In this way, a maximum likelihood vector decoder may be constructed given an estimate of the channel matrix that is present within each SOP bin. The maximum likelihood decoder computes the weighted vector Euclidean metric given the deinterleaved received vector from each SOP bin, the deinterleaved matrix channel estimates from each SOP bin, and the transmitted vector symbol trellis state table.

In another alternative embodiment, either of the aforementioned encoder embodiments will have preferable performance if the encoder polynomial and symbol constellation set are optimized to improve the bit error rate performance given the characteristics of the matrix channel fading that occurs in each SOP bin. One particular metric that is well suited for a code polynomial optimization search is the product of the two norms of the vector difference between the correct transmitter symbol vector and the error symbol vector.

The output of DD block 150 is the estimated bit stream at the receive end of the radio link.

It is to be understood that all transmitter embodiments of the present invention may be adapted for use with a receiver accessing the channel through a single channel output such as a single receiver antenna element. Furthermore, all receiver embodiments of the present invention may be adapted for use with a transmitter accessing the channel through a single channel input such as a single transmitter antenna element. It is understood that the channel is then a vector channel. Such multiple-input single-output (MISO) and single-input multiple output (SIMO) systems are within the scope of the present invention.

Space-Frequency Communication In a Multipath Channel

Figure 4:
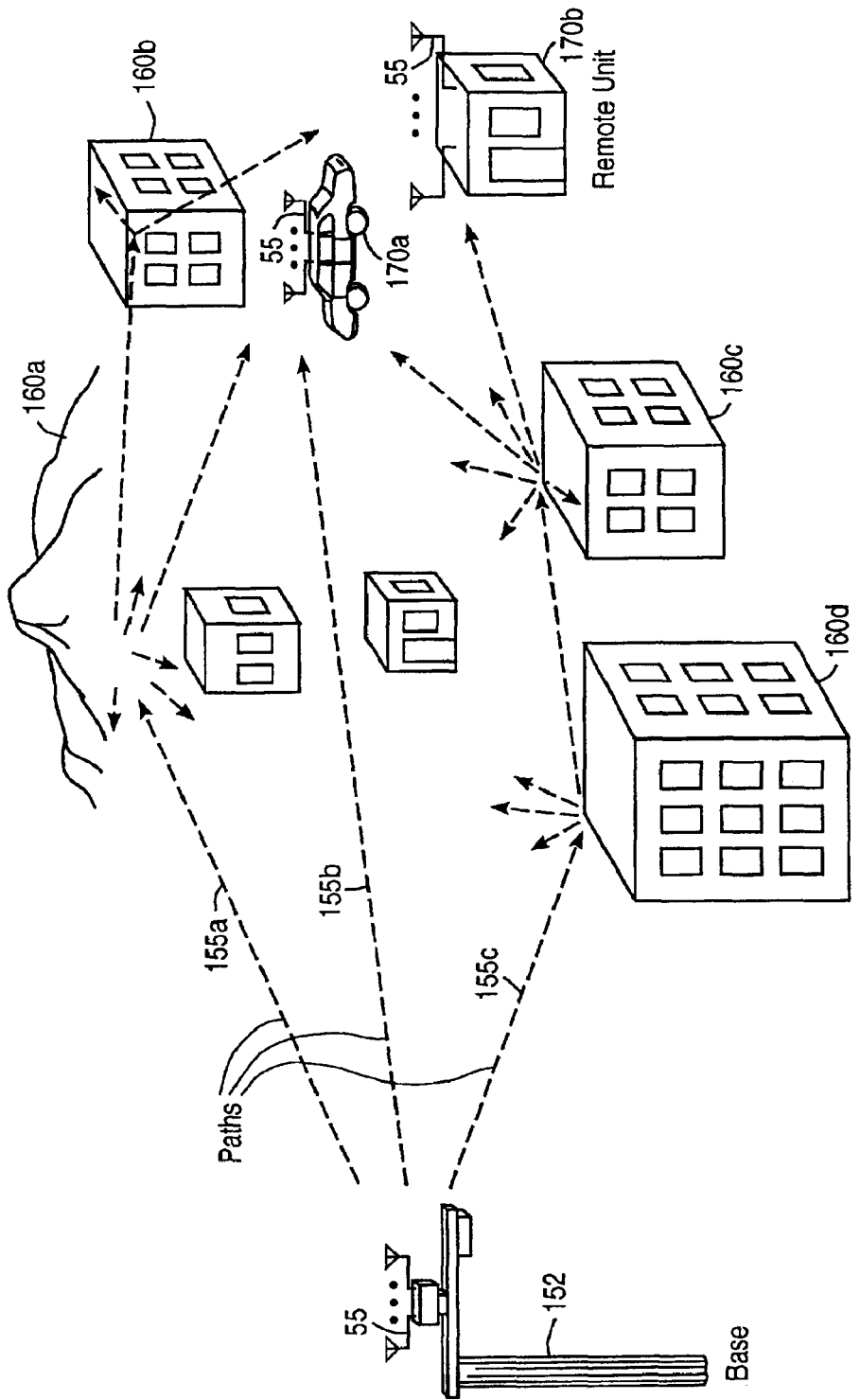
FIG. 4 depicts a first communication scenario where multipath is found.

Before developing the signal processing of the present invention, a physical description and mathematical description of wireless channels are provided. Many wireless communication channels are characterized by multi-path, where each path has associated fading and propagation delay. Multipath may be created by reflections in the physical radio path, multiple antenna polarizations, antenna elements located in disparate locations, or a combination of any of these. One scenario in which multipath is created is illustrated in FIG. 4. A Base 152 transmits information to and receives information from a remote unit 170A or 170B. Base 152 possesses one or more antenna elements referred to as an array 55. Similarly, the Remote Units possess their own arrays 55. A transmitted signal propagates along multiple paths 155A-C created by reflection and scattering from physical objects in the terrain 160A-D.

Figure 5:
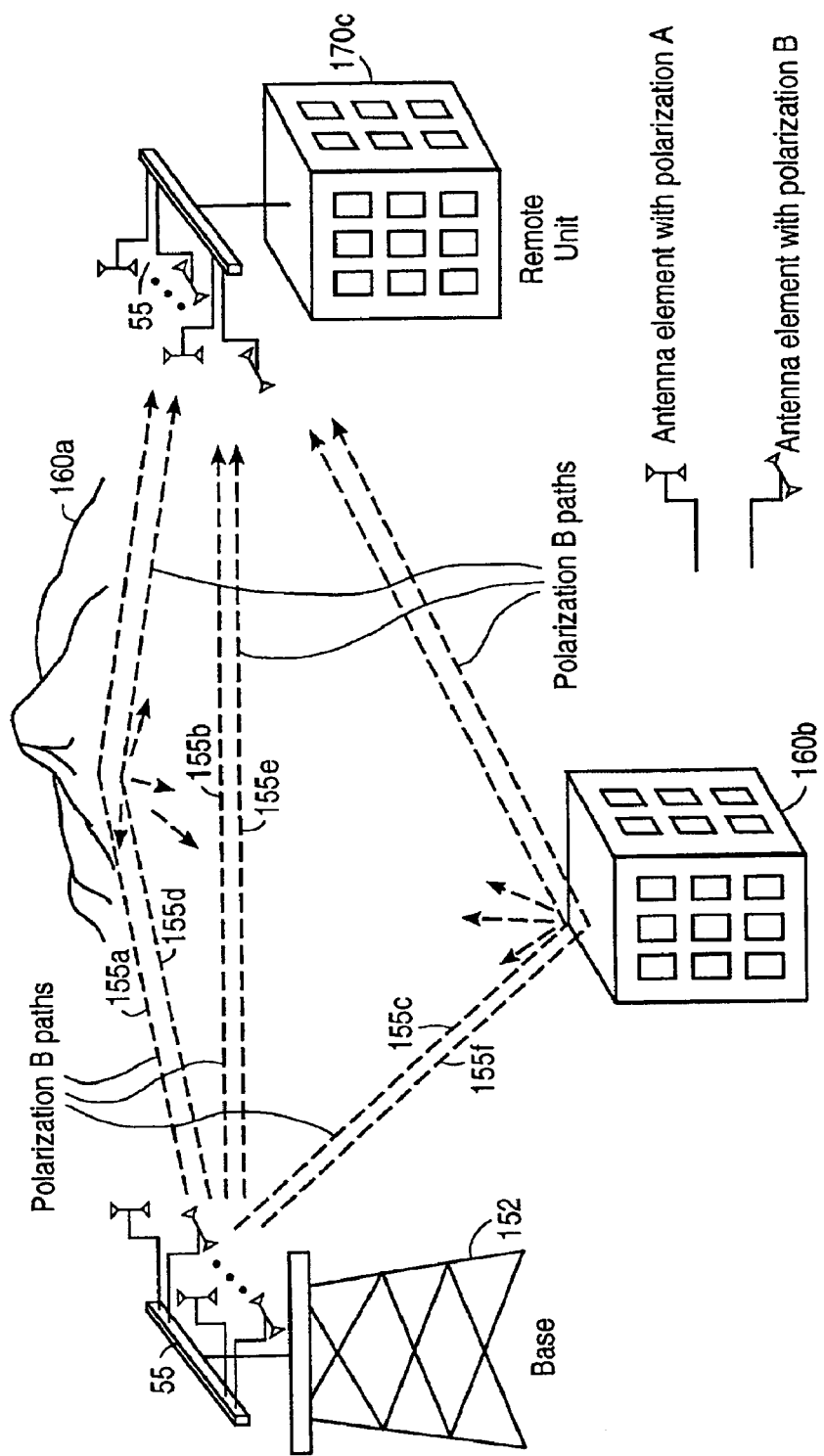
FIG. 5 depicts a second communication scenario where multipath is found.
Figure 6:
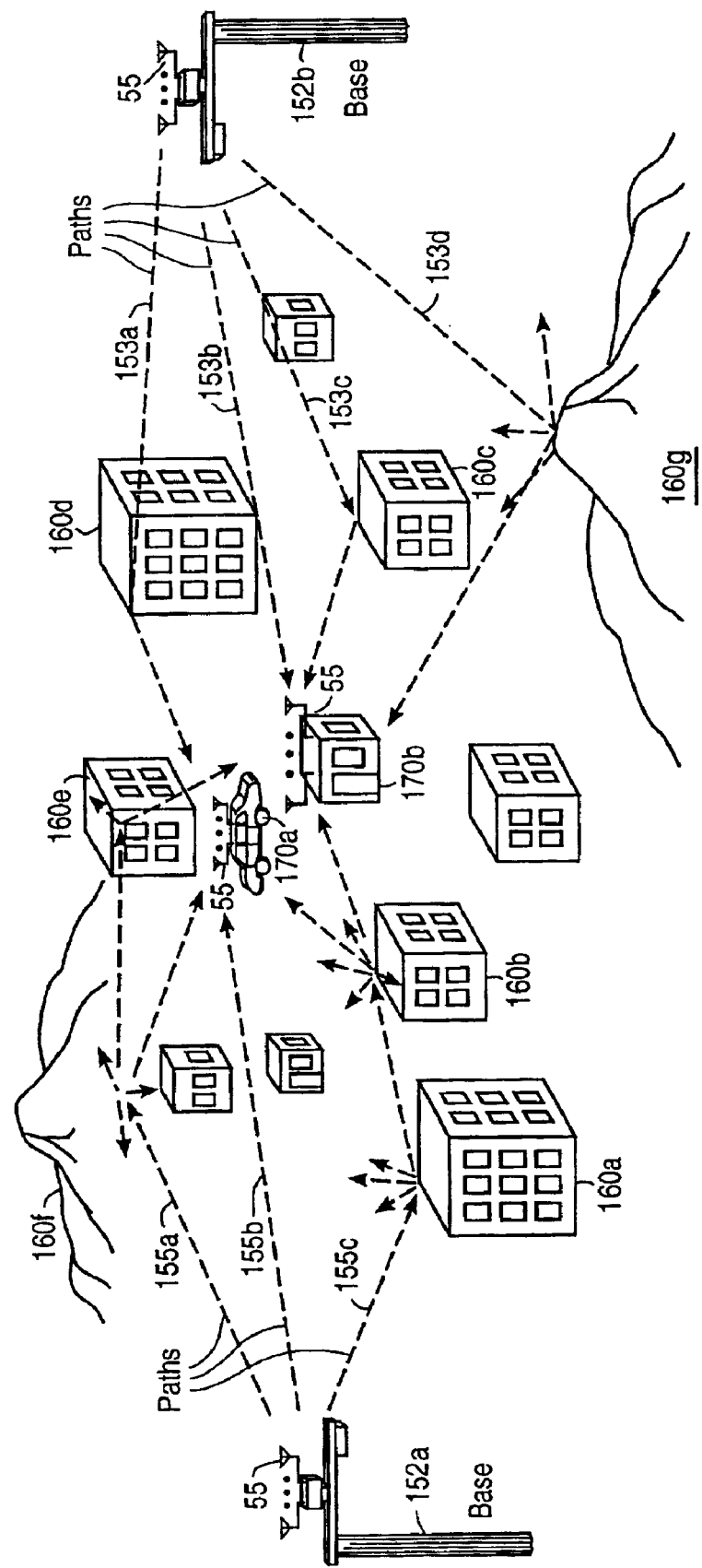
FIG. 6 depicts a third communication scenario where multipath is found.

Multipath signal propagation such as that depicted in FIGS. 4-6 can give rise to spatially selective fading, delay spread, frequency fading, and time fading. Spatial fading occurs as the various wavefronts arriving at the receiver from different propagation paths combine with constructive and destructive interference at different points in space. An antenna array located within this spatially selective field will sample the field at various locations so that the signal strength at each array element is different. Delay spread occurs due to the differing propagation path lengths. The channel delay spread gives rise to a frequency selective digital communication channel at each antenna element. This frequency response is different for each antenna element by virtue of the frequency dependent spatial fading. Finally, if either the transmitter, or the receiver, or objects in the terrain are moving, the frequency selective spatial fading will vary as a function of time. The present invention is unique in that it is capable of efficiently and economically adapting to the time varying space-frequency channel response to make advantageous use of the inherent properties of such channels.

For several decades, the primary focus of the prior art has been to somehow mitigate the effects of the multipath channel. This conventional approach is ill-advised since multipath channels give rise to a multiplicative capacity effect by virtue of the fact that the multipath induces a rank greater than one in the matrix channel present in each SOP bin. This provides opportunity to form multiple parallel subchannels for communication within each SOP bin. Thus, one should utilize multipath to improve communication performance rather than attempt to mitigate its effects. A substantial advantage provided by the present invention is the ability to efficiently and economically exploit the inherent capacity advantages of multipath channels using a combination of an SOP and spatial processing or spatial coding. No other structures are known to efficiently exploit this fundamental advantage in the presence of substantially frequency selective multipath channels.

FIG. 5 illustrates another wireless channel scenario in which multipath is present. A Base 152 with an antenna array 55 transmits information to and receives information from a Remote 170C with an antenna array 55. In this case, both Base and Remote antenna arrays 55 both have elements with differing polarizations. Thus multipath signal propagation exists even if there are no significant reflections in the physical environment. The direct line of sight paths 155B, 155E each corresponding to one of the polarizations in the array elements, are sufficient to create a matrix channel with a rank greater than one within each SOP bin, even if the other reflected radio paths 155A, 155C, 155D, and 155F are insignificant or nonexistent.

It is known that such line of sight polarization (reflection free) channels can be decomposed into two parallel communication channels by using high performance dual polarization antennas, one at each end of the radio link, in combination with high performance receiver and transmitter electronics apparatus. In this prior art, the quality of the parallel communication channels is limited by the degree to which the two polarization channels remain independent. In general, maintaining the manufacturing tolerances and installation alignment precision in the antennas and electronics required to achieve substantially orthogonal spatial subchannels at the output of the physical receive antenna is relatively expensive. Slight manufacturing errors and component variations can lead to a significant cross-talk interference between the multiple polarizations present in the radio channel. In contrast, an advantageous feature of the invention is that the different polarizations present in the wireless channel may have an arbitrary degree of cross-talk interference, and the cross-talk interference may be frequency dependent without loss of performance. In such cases, the invention provides an economical and efficient method for fully exploiting the multi-dimensional nature of the multiple polarization channel. It is understood that the invention can provide further capacity advantage if the multiple polarization channel also has reflected signal paths. This additional multipath results in an additional increase in the channel matrix rank in each SOP bin that can be further exploited to improve the capacity of the channel.

FIG. 6 depicts another wireless communication scenario in which multipath is present and can be exploited to create multiple dimensions for communication. In FIG. 6, two Bases 152A and 152B with antenna arrays 55 communicate with Remote Units 170A and 170B that also possess antenna arrays 55. In this case, the composite channel is defined as the MIMO channel between the antennas of the two Bases 152A and 152B and the antennas of the Remote Units 170A and 170B. Note that this channel includes direct line of sight paths 155B and 153B as well as the reflected paths 155A, 155C, 153A, 153C, and 153D. By virtue of the spatial separation between two Bases 152A and 152B, even if the reflected paths are insignificant or nonexistent, this channel contains multipath that can be exploited using the invention. In addition, the channel from the antennas of the two Bases to the antennas of one Remote is again a matrix channel, with rank greater than one, within each SOP bin so that multiple parallel dimensions for transmission may be created. In these types of applications, the present invention provides for the ability to reduce interference radiate to unintentional receivers. Furthermore, the present invention provides the capability of reducing the detrimental effects of received interference from unintentional transmitters.

Thus it can be seen that multiple transmitter antenna elements or multiple antenna elements may be either co-located or be found at disparate locations. The following symbol channel model applies to all of the above multipath radio propagation cases illustrated by FIGS. 4-6. The channel impulse response includes the effects of the propagation environment, as well as the digital pulse shaping filters used in TSFP 30 and RSFP 140, the analog filters used in Modulation & RF System 40 and Demodulation & RF System 120. Due to the difference in propagation delay between the various multipath components combined with the time domain response of the RF and digital filter elements, a single symbol transmitted into the channel is received as a collection of delayed copies. Thus, delayed and scaled versions of one symbol interfere with other symbols. This self interference effect is termed intersymbol interference or ISI. The delay spread parameter, denoted by v, is the duration in symbol periods of the significant portion of the channel impulse response.

As the transmitted symbol rate is increased or as the physical geometries in the channel become larger, the delay spread can become so large that conventional space-time processing systems become highly complex. An advantage of the present invention is that the signal processing complexity is relatively low even when the delay spread becomes extremely large. This allows for the economical application of MIMO space-frequency processing techniques at high digital data rates. This efficient use of signal processing comes about because the invention allows the space-time channel to be treated as a set of substantially independent spatial subchannels without sacrificing channel capacity. In contrast, conventional approaches either attempt to equalize the much more complex space-time channel or alternatively sacrifice capacity.

The channel is modeled as time-invariant over the time spanned by a burst of N data symbols, but varying from one burst to another. This block time invariant assumption produces a channel model that is sufficiently accurate for channels wherein the block duration is short compared to the channel fading, or (N+2v)T<<$\Delta_\beta$, where $\Delta_\beta$ is the correlation interval[1]. Other models are available wherein the channel varies continuously, but these models add unnecessary complication to the present discussion. It is understood that rapid time variation in the channel can be another motivation for choosing one of the other SOP alternatives in the presence of fading rates that are rapid with respect to the burst frequency. One skilled in the art will be aware of the pertinent issues for a given application. For example, Orthogonal Frequency Domain Multiplexing (OFDM) is an SOP composed of an IFFT and cyclic prefix as the transmitter SOP, and an FFT as the receiver SOP. With OFDM, one pertinent issue is frequency domain inter-carrier interference (ICI), which can occur in OFDM systems with extremely rapid fading. Such pertinent issues shape the appropriate choice of channel models for various SOP basis functions.

The correlation interval here is defined as the time period required for the fading parameter time-autocorrelation function to decrease to some fraction of the zero-shift value.

With this background discussion, it can be verified by one skilled in the art that the relationship between the transmitted burst of baseband symbols and the received burst of baseband samples may be adequately expressed as the space-time equation, $x(k)=G(k)z(k)+I(k)$, where the index k represents bursts. The composite channel output for one burst of data, $x(k)$, is written with all time samples appear in sequence for every receive antenna 1 to $M_R$, $x(k)=\lfloor x_1(1) \ldots x_1(N+v-1) \ldots x_{M_R}(1) \ldots x_{M_R}(N+v-1)\rfloor^T$.

Likewise, the input symbol vector is written, $z(k)=\lfloor z_1(1) \ldots z_1(N) \ldots z_{M_T}(1) \ldots z_{M_T}(N)\rfloor^T$.

The quantity $I(k)$, defined the same as $x(k)$ and $z(k)$, represents both noise and interference. The MIMO channel matrix, $G(k)$, is composed of single-input single-output (SISO) sub-blocks, $$G(k) = \begin{bmatrix} G_{1,1}(k) & \ldots & G_{1,M_T}(k) \\ \vdots & \ddots & \vdots \\ G_{M_R,1}(k) & \ldots & G_{M_R,M_T}(k) \end{bmatrix} \in C^{NM_T \times (N+v)M_R}. \quad (1)$$

Figure 7:
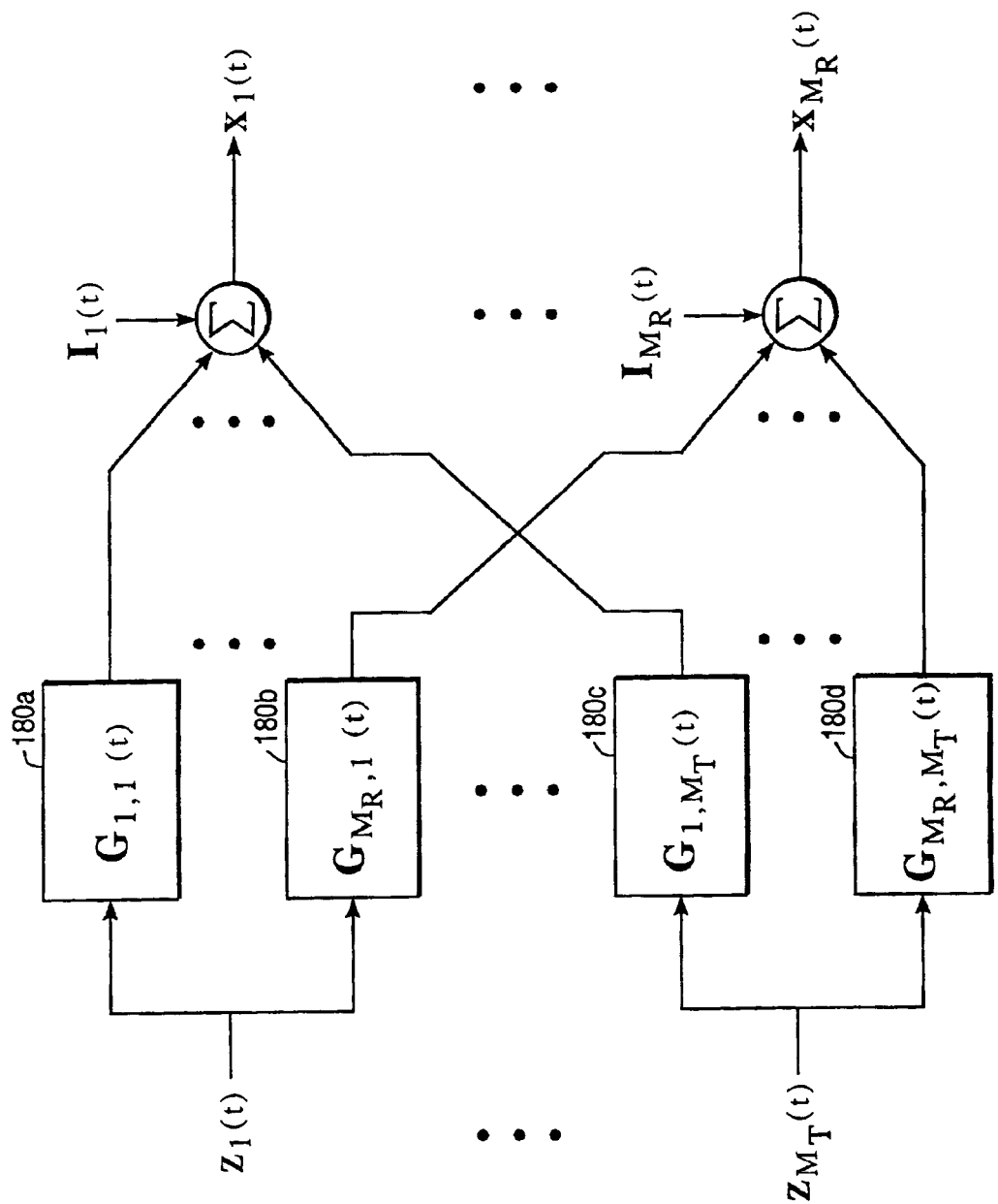
FIG. 7 depicts a multiple-input, multiple-output (MIMO) channel with interference.

Furthermore, each of the SISO sub-blocks, $G_{i,j}(k)$, is a Toeplitz matrix describing the input-output relationship between the transmitted symbol burst and the received symbol burst for antenna pair (i,j). This MIMO space-time channel is illustrated by FIG. 7, which shows SISO sub-blocks 180A-D and the addition of interference for each receiver sample.

Space-Frequency Processing

Embodiments of the present invention uses space-frequency processing at either the transmitter or receiver, or both, to create effective communication systems in wireless channels. Generally, the processing substantially eliminates the ISI caused by the channel correlation across space (antenna correlation) and time (delay spread). This processing greatly simplifies the design of the remaining functions that comprise a complete communication system, including coding and modulation. Furthermore, the processing approach is based upon a capacity-achieving structure for the MIMO wireless communication channel. Space-frequency processing is composed of one or more of the following: an SOP, a transmit spatial processor, and a receive spatial processor.

Substantially Orthogonalizing Procedure

Figure 8:
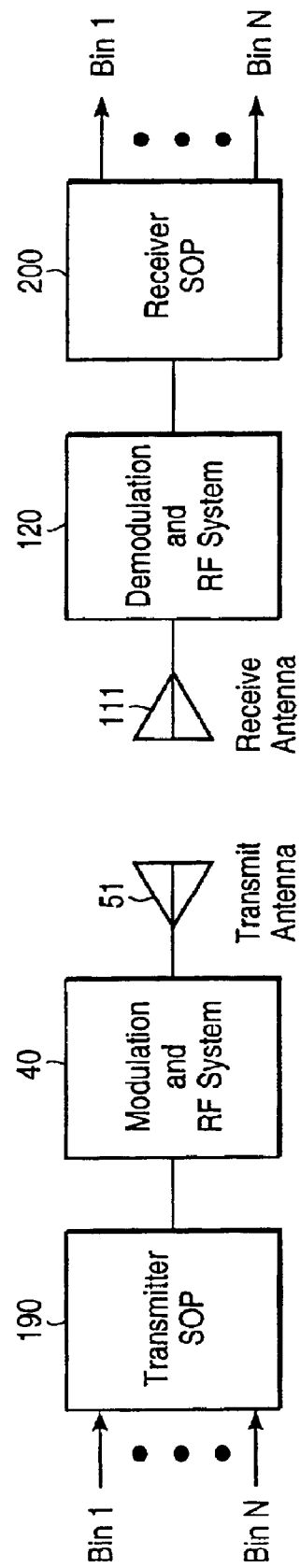
FIG. 8 depicts the use of an SOP in a single-input single-output (SISO) channel.

The use of an SOP in a SISO channel is considered first in order to illustrate the invention's ability to eliminate ISI across space and time. The SOP is composed of signal processing operations implemented at both the transmit and receive sides of the channel. This is illustrated in FIG. 8 where a Transmitter SOP processor 190 and a Receiver SOP processor 200 jointly perform a complete SOP. The SOP ensures that the N input symbols, in bin 1 through bin N, are transmitted through the channel in such a way that each output symbol is substantially influenced by only the input symbol of the same frequency bin. For example, the input symbol in bin 1 is the only symbol to have substantial influence on the output symbol value in bin 1.

Figure 9:
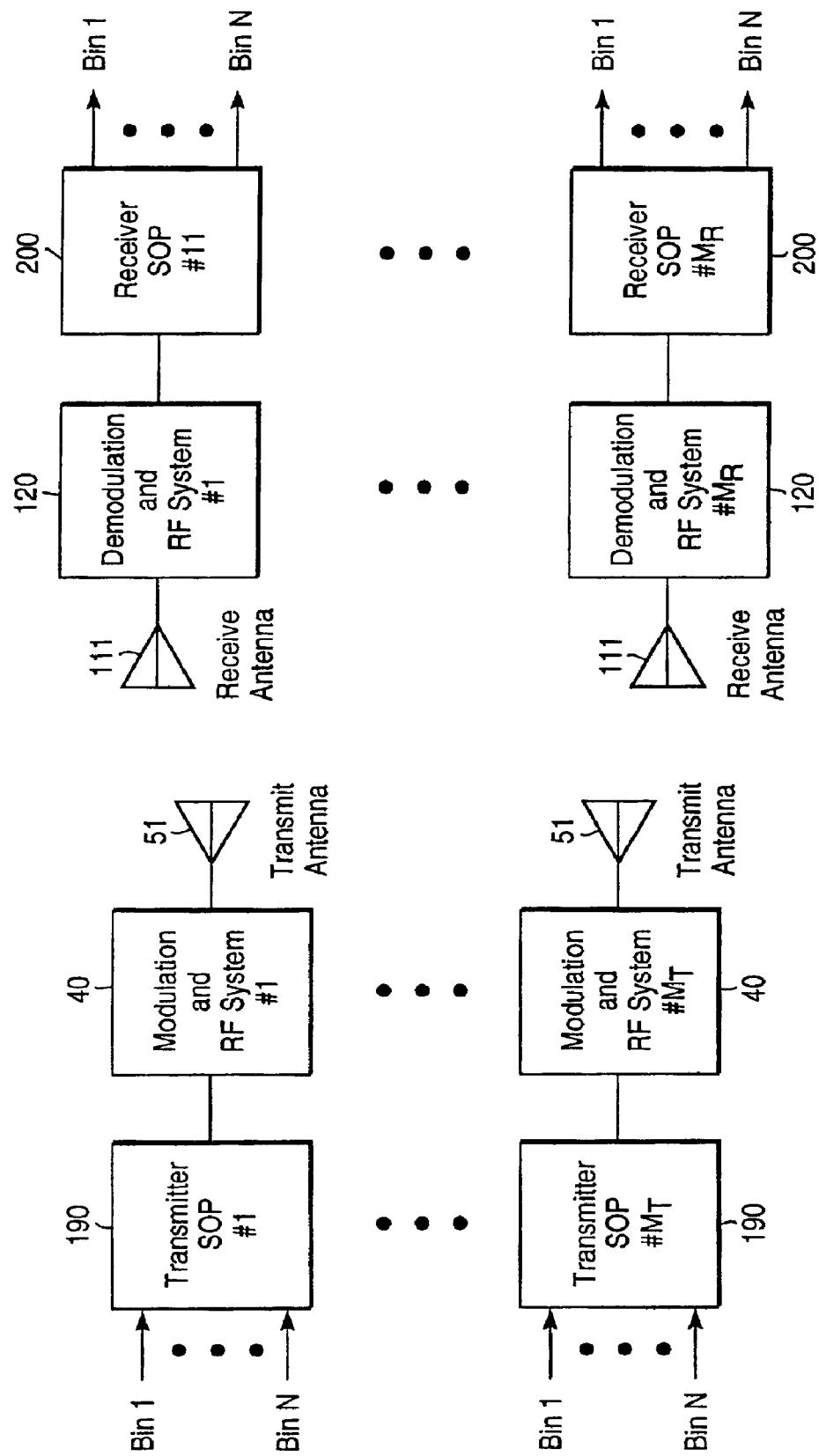
FIG. 9 depicts the use of an SOP in a MIMO channel according to one embodiment of the present invention.

This concept generalizes to the MIMO system as shown in FIG. 9. For the MIMO system, each transmitter antenna 51 is preceded by one of $M_T$ identical Transmitter SOP processors. Likewise, each receiver antenna 111 precedes one of $M_R$ identical Receiver SOP processors. Hence, the processing path for any transmitter-receiver antenna pair contains a jointly performed complete SOP. In other words, there exist $M_R M_T$ SISO SOPs in the MIMO system. By exploiting the property of superposition, this collection of SISO SOPs comprise a MIMO SOP where any two symbols communicated in different bins exhibit substantially reduced crosstalk, irrelevant of the antennas by which the symbols were transmitted and received. Therefore, the SOP establishes N substantially independent MIMO spatial channels.

Figure 10:
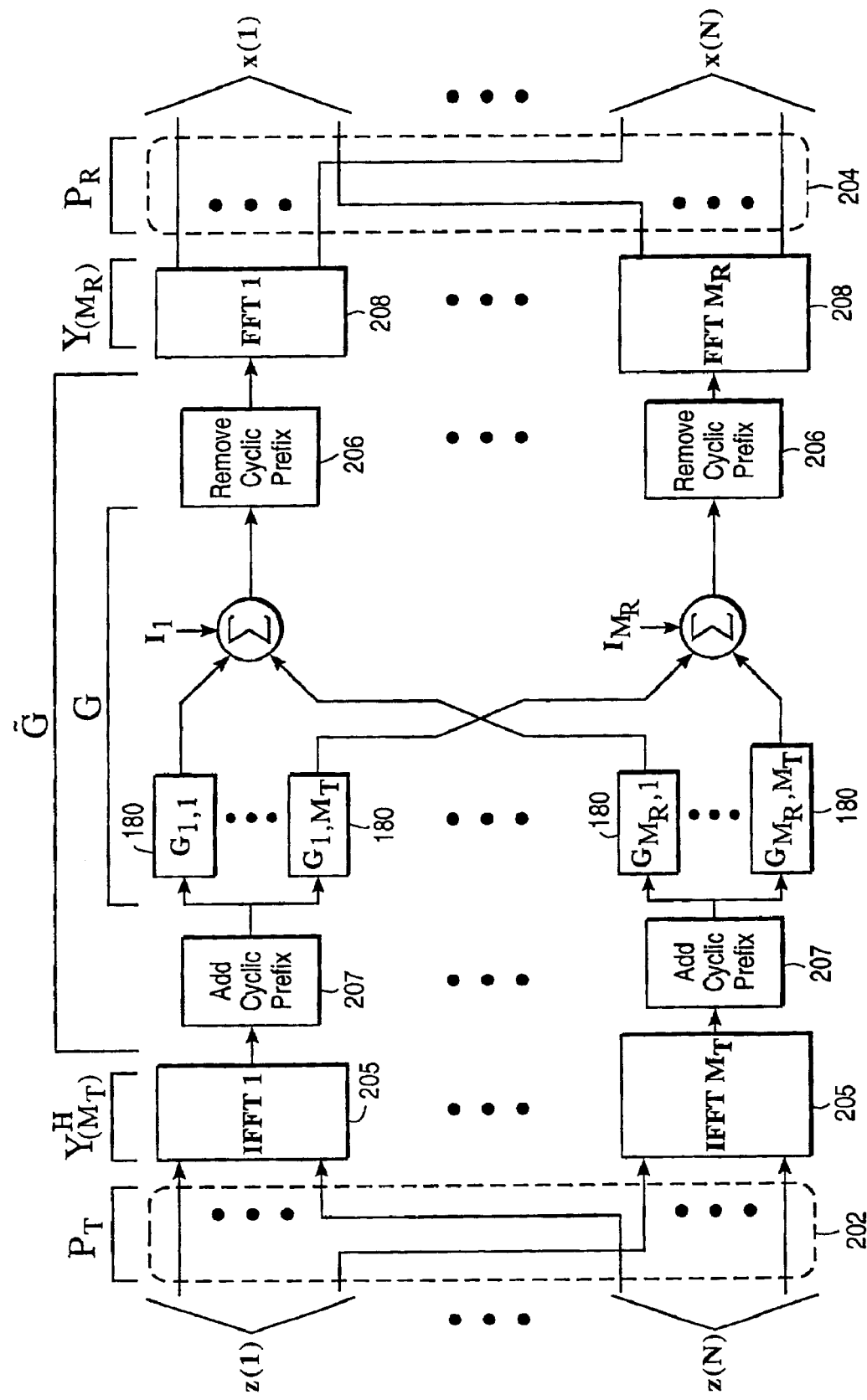
FIG. 10 depicts the operation of an SOP in the context of one embodiment of the present invention.

Many different SOP implementations exist, including an IFFT-FFT pair, a bank of multiple narrow-band filters, and generalized wavelet transform pairs. One advantageous example of an SOP is the use of a frequency transform combined with a burst cyclic prefix application procedure processor 207, as shown in FIG. 10. There is also a cyclic prefix removal procedure processor 206 at the receive end. When the frequency transform is an IFFT-FFT pair 205 and 208 as shown in FIG. 10, this particular SOP is commonly referred to as discrete orthogonal frequency division multiplexing (OFDM). Hence, this embodiment of the invention combines the OFDM SOP with multiple input antennas, or multiple output antennas, or both multiple input and multiple output antennas. The present embodiment is thus termed matrix-OFDM (MOFDM).

The analysis presented for MOFDM will have a substantially similar form as other choices for the SOP. These alternative embodiments have certain advantages and drawbacks as compared to the OFDM SOP. For example, the multi-band SOP does not completely eliminate ISI, but it is more robust to certain types of narrow-band interfering signals because the interference can be more confined within a given SOP bin as compared to the OFDM SOP. The ISI that can be present in the multi-band SOP could make it advantageous to use pre-equalization or post-equalization structures in conjunction with the spatial processing within a given SOP bin. While this complicates the spatial processing, the complexity drawback may be outweighed by other requirements such as robustness to interference or the need to separate the SOP bins by relatively large frequency separation. Only the OFDM SOP will be analyzed in detail herein and it will be understood that one may exploit the other SOP choices as needs dictate.

As depicted in FIG. 10, the exemplary SOP operates in the following fashion. The symbols from the transmit spatial pre-processor, $z_j(n)$, considered to be in the frequency domain, are organized into $M_T$ vectors of N complex symbols. Each of these vectors is then converted to the time-domain using an N-point inverse-fast-Fourier-transform (IFFT) procedure 205. Each of the parallel $M_T$ time-domain sequences has a cyclic prefix added to the beginning, so that the last v elements in the IFFT output sequence form a pre-amble to the N-element IFFT output. The cyclic prefix operation is given by:

$$[z(1) \ldots z(N)]^T \mapsto [z(N-v+1) \ldots z(N) \, z(1) \ldots z(N)]^T$$

The application of the cyclic prefix is performed by cyclic prefix application procedure processor 207. For each antenna, the (N+v)-length sequences are passed to the RF transmit chain for D/A conversion and modulation.

Likewise, each RF receiver chain produces a sampled sequence of length N+v. Cyclic prefix removal procedure processors 206 remove the cyclic prefix from each sequence by discarding the first v data symbols, resulting in $M_R$ vectors of N complex symbols. Each of these $M_R$ sequences is then processed with an N-point fast-Fourier-transform (FFT). These symbols are then passed to the receiver spatial processor.

The effect of the SOP is to substantially remove the ISI between any two symbols assigned to different bins, for any pair of transmit and receive antennas. Therefore, for each IFFT-FFT bin n, the received signal values for each antenna, x(n), are related to the transmitted frequency-domain symbols, z(n), through the expression, $$x(n) = H(n)z(n) + I(n) \, \forall n \quad (10)$$

where x(n) is a complex $M_R$-element vector at SOP bin n, z(n) is a complex $M_T$-element symbol vector at bin n, and I(n) is the interference and noise at all receive antennas for bin n. Note that a time index is not included in the above equation since it is assumed that channel is time-invariant over the length of a burst. The spatial sub-channels, H(n), are $M_R$ by $M_T$ element matrices that describe the spatial correlation remaining in the wireless channel after the SOP. For the MIMO case, each SOP bin may be characterized by a matrix of complex values, with each value representing the path gain from a given transmit antenna element to a given receive antenna element in that particular SOP bin.

To understand the result given by Equation(10), it is instructive to show how the SOP preprocessor and postprocessor acts upon the time-domain channel. The MIMO time-domain channel, G(k), contains $M_R M_T$ Toeplitz matrices that describe the time-domain input-output behavior of each antenna pair (see eq. 1). This channel formulation is depicted in FIG. 10. It is well known that by adding a cyclic prefix at the transmitter and subsequently removing the prefix at the receiver, a Toeplitz intput-output matrix is transformed into a circulant input-output matrix (the ith row is equal to the jth row cyclicly shifted by i-j elements). Therefore, the each $G_{i,j}$ in FIG. 10 is transformed into a circulant $\tilde{G}_{i,j}$. The MIMO circulant matrices are delimited in FIG. 10 by $\tilde{G}$.

This particular class of SOP exploits the fact that any circulant matrix can be diagonalized by a predetermined matrix operator. One such operator is a matrix of the FFT basis vectors. That is, for any circulant matrix $\tilde{G}$, $$D = Y\tilde{G}Y^H$$

where D is some diagonal matrix and the scalar elements of Y are, $$y_{mn} = \frac{1}{\sqrt{N}} e^{-j2\pi mn/N}.$$

Applying $M_T$ IFFT operations at the transmitter and $M_R$ FFT operations at the receiver is described mathematically by a pre-multiplication of a $NM_R \times NM_R$ block diagonal FFT matrix and post-multiplication of a $NM_T \times NM_T$ IFFT matrix. For example, the former matrix is defined, $$Y_{(M_R)} = \begin{bmatrix} Y & & 0 \\ & \ddots & \\ 0 & & Y \end{bmatrix}.$$

Therefore, including the transmitter IFFT and receiver FFT operations, the input-output relationship is described by $$Y_{(M_R)}\tilde{G}Y^H_{M_T} = \begin{bmatrix} D_{1,1} & \cdots & D_{1,M_T} \\ \vdots & \ddots & \vdots \\ D_{M_R,1} & \cdots & D_{M_R,M_T} \end{bmatrix},$$

where $D_{i,j}$ is the diagonal matrix containing the SOP bin strengths for the antenna pair (i,j). Pre-multiplication and post-multiplication by permutation matrices $P_T$ and $P_R$ represents the collection of all antenna combinations that correspond to a common frequency or SOP bin. This collection process, depicted in FIG. 10, results in a block diagonal matrix that relates the intputs and outputs:

$$P_R Y_{(M_R)} \tilde{G} Y^H_{M_T} P_T = \begin{bmatrix} H(1) & & 0 \\ & \ddots & \\ 0 & & H(N) \end{bmatrix},$$

which is equivalent to Equation (10).

Spatial Processing

Figure 11:
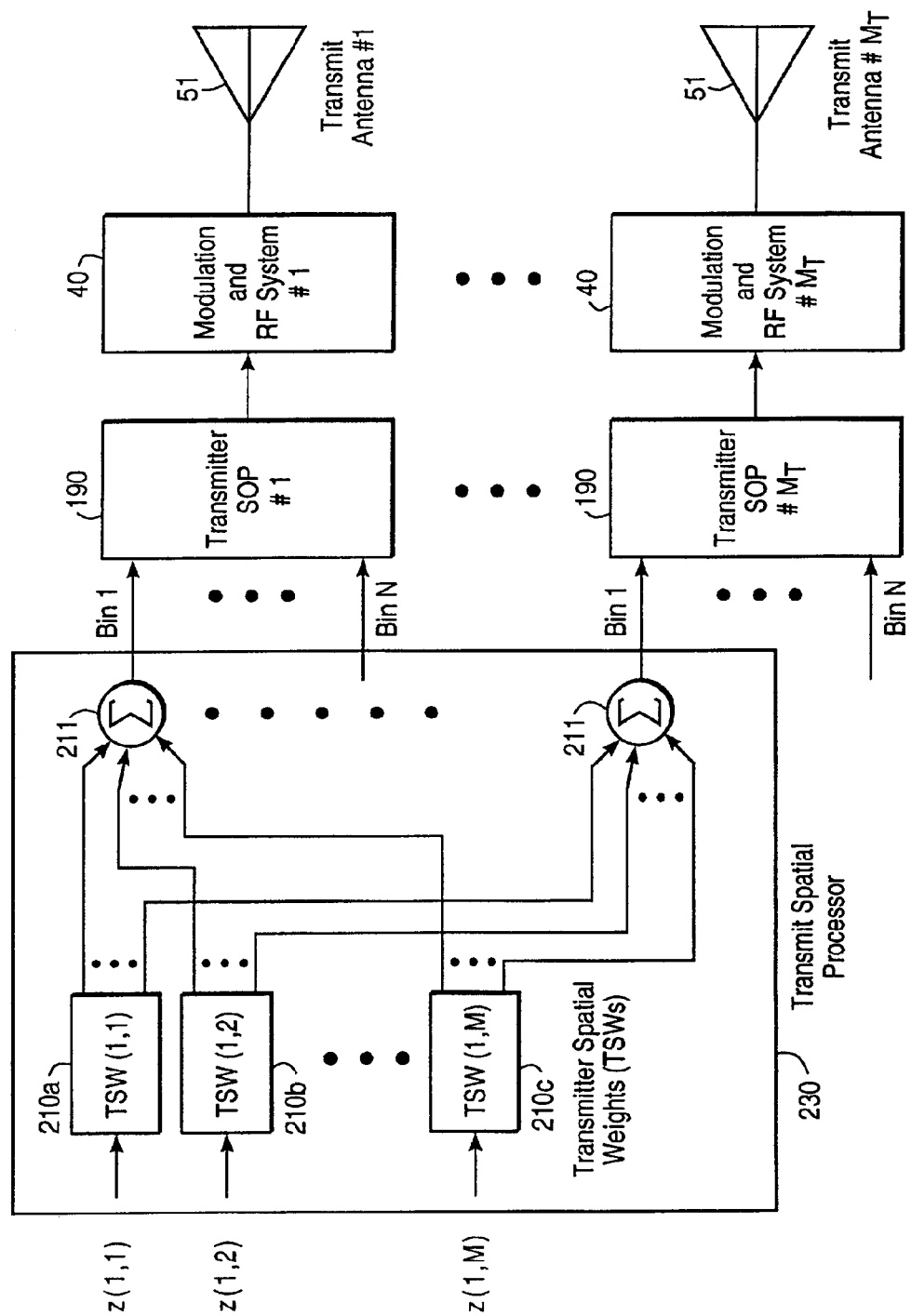
FIG. 11 depicts the application of spatial processing to a particular SOP bin at the transmitter end according to one embodiment of the present invention.
Figure 12:
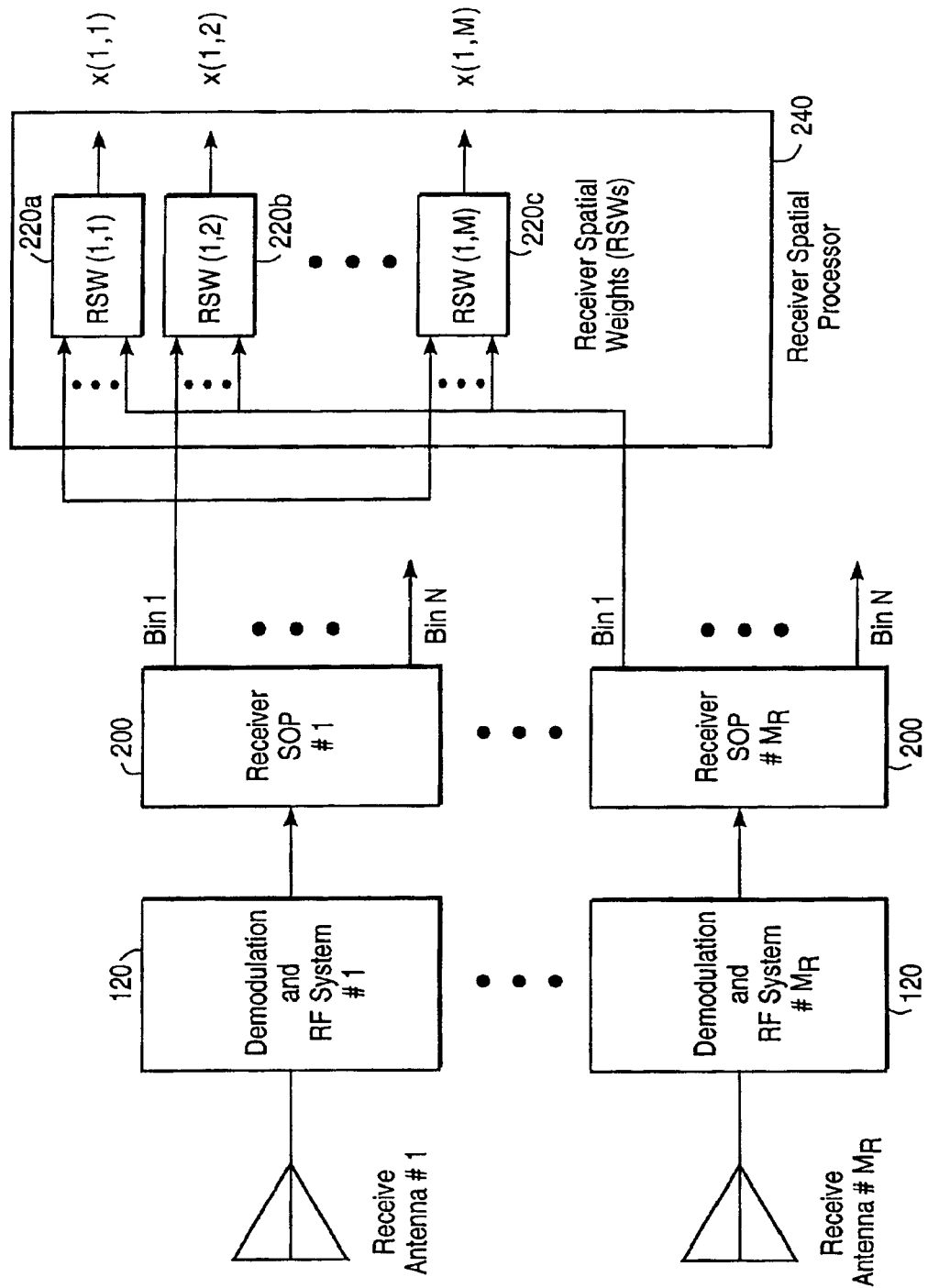
FIG. 12 depicts the application of spatial processing to a particular SOP bin at the receiver end according to one embodiment of the present invention.

The spatial processing procedure is now considered. Since the SOP establishes N MIMO spatial channels that are substantially independent from one another (Equation 10), one can consider the spatial processing within each bin separately. Representative application of spatial processing to frequency bin 1 will be considered as shown in FIG. 11 at the transmitter and FIG. 12 at the receiver. FIG. 11 shows M symbols: z(1,1) through z(1,M). The notation z(n,m) refers to the symbol transmitted in bin n and spatial direction m. These M symbols will jointly occupy frequency bin 1. Each TSW 210A-C applies a weight vector to the symbol appearing at its input, and the elements of the resultant vector are routed to MT summing junctions 211. One may consider the TSWs as being multipliers taking each input symbol and multiplying it by a vector that corresponds to a spatial direction in $M_T$-space. Furthermore, the M vectors define a subspace in $M_T$-space. Note that the TSW vectors are considered to be column vectors in the discussion that follows. When these M vectors are collected into a matrix, the result is an input orthogonalizing matrix or beneficial weighting matrix for that bin. For each input bin, a vector including symbols allocated to subchannels corresponding to the bin is multiplied by the input orthogonalizing matrix to obtain a result vector, elements of the result vector corresponding to the various transmitter antenna elements. Together, the TSWs 210A–C make up one embodiment of a Transmit Spatial Processor (TSP) 230.

Each RSW 220A-C accepts $M_R$ inputs, one from each receiver antenna path. Within the $m^{th}$ RSW, a weight vector is applied to the inputs (i.e. an inner-product is performed) thereby producing a received signal sample x(1,m):

$$x(1,m) = u(1,m) \begin{bmatrix} x_1(1) \\ \vdots \\ x_{M_R}(1) \end{bmatrix},$$

where u(1,m) is the RSW for bin 1 and spatial direction m. Similar to a TSW, a RSW vector has an associated direction in $M_R$-space. Each RSW may also be considered to be a multiplier. This vector is considered to be a row vector. When these M RSW vectors are collected into a matrix, the result is an output orthogonalizing matrix or beneficial weighting matrix for that bin. When a vector including symbols in a particular output bin produced by the SOP for each receiver antenna is multiplied by the output orthogonalizing matrix, the result is a vector including symbols received in that bin for various spatial directions. Together, the RSWs 220A–220C represent one embodiment of a Receive Spatial Processor (RSP) 240.

Through proper choice of the weight vectors applied via the TSWs and RSWs, the M spatial directions can be made substantially orthogonal to one another. The result is that the received signal sample x(1,m) depends only upon input symbols z(1,m) and not the M−1 other input symbols for SOP bin 1. Methods for selecting the TSP and RSP weight vectors are described in detail below.

Figure 13:
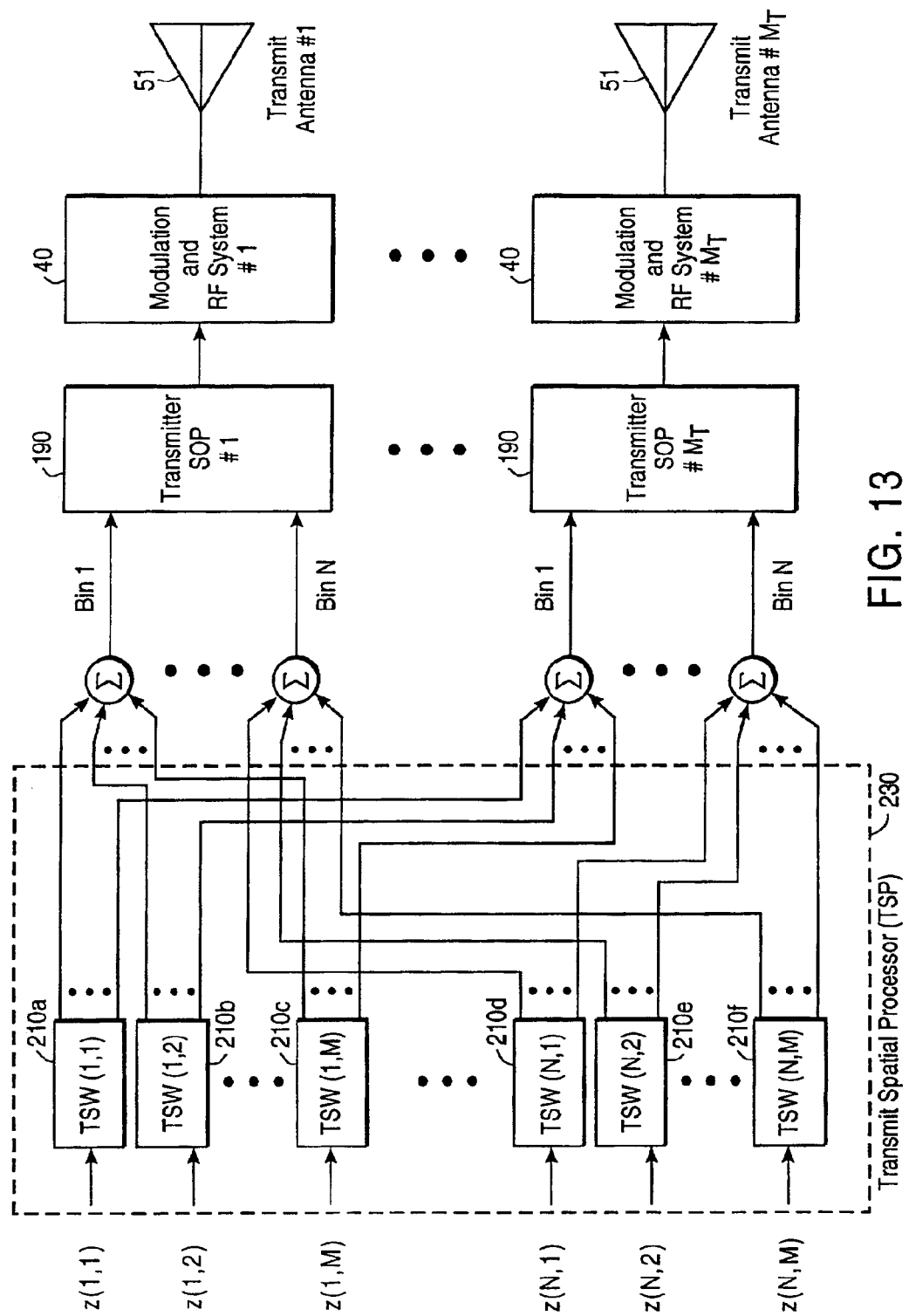
FIG. 13 depicts the application of spatial processing to N SOP bins at the transmitter end according to one embodiment of the present invention.
Figure 14:
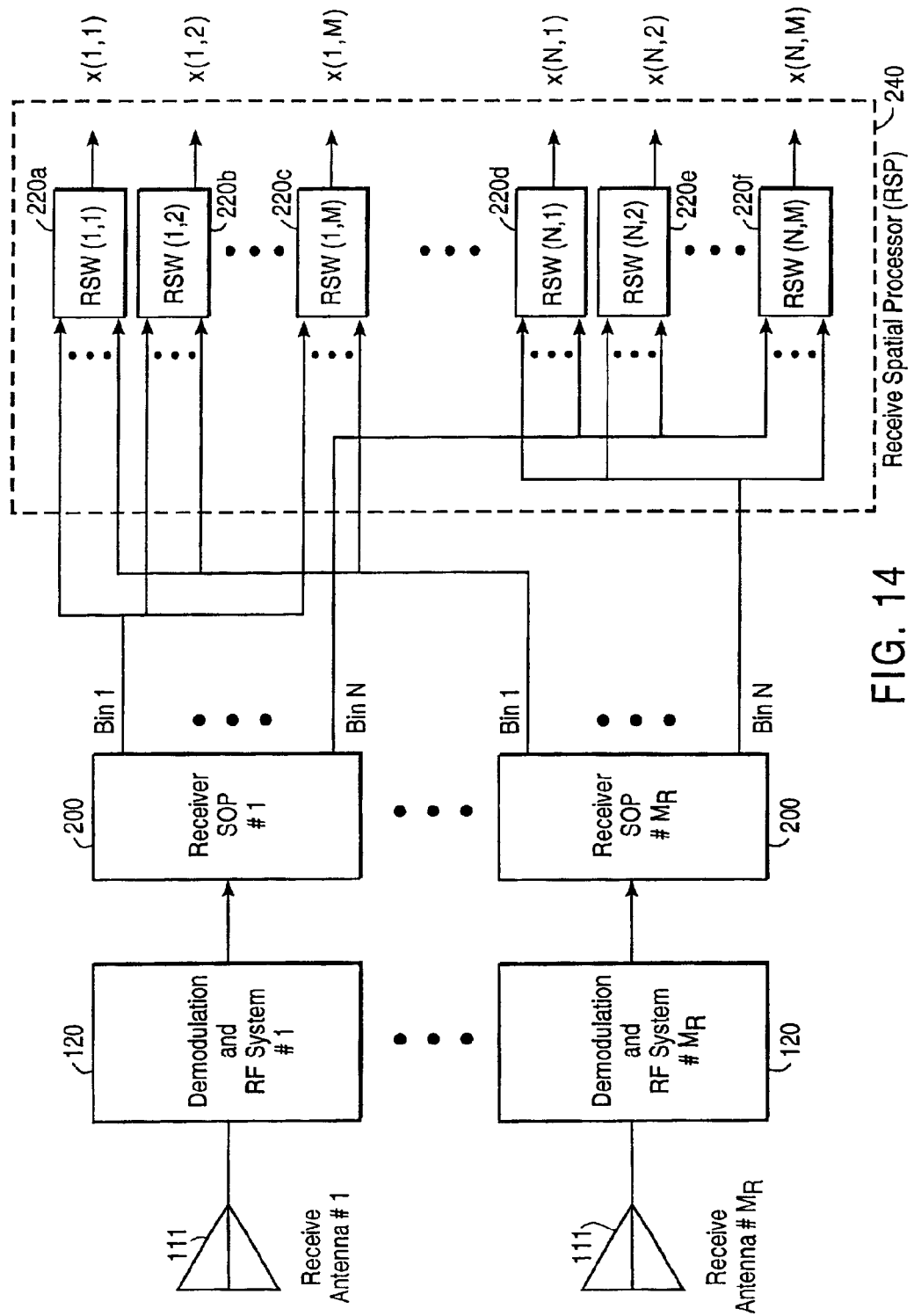
FIG. 14 depicts the application of spatial processing to N SOP bins at the receiver end according to one embodiment of the present invention.

The spatial processing described above can be applied to the other N−1 frequency bins in addition to frequency bin 1. The block diagram for such a system is depicted in FIG. 13 for the transmitter and FIG. 14 for the receiver. SOP processors 190 and 200 ensure that the frequency bins remain substantially orthogonal to one another while TSP 230 and RSP 240 ensure that M substantially orthogonal spatial channels exist within each frequency bin. The net result is that NM substantially parallel subchannels are constructed within the MIMO communication system. In other words, the combination of SOP processors 190 and 200, TSP 230, and RSP 240 create a set of substantially independent space-frequency subchannels, $$x(n,m)=H(n,m)z(n,m)+I(n,m) \forall n,m.$$

This simultaneous substantial orthogonalization of space and frequency can result in a significant increase in spectral efficiency since multiple data streams are being communicated through the channel. Note that the number of substantially independent subchannels possible, in the multipath case, is equal to the number of SOP bins multiplied by the number of transmit antennas or the number of receive antennas, whichever is smaller. Therefore, the total number of space-frequency subchannels is less than or equal to N min($M_T,M_R$), when multipath is present.

An exemplary set of TSWs and RSWs are derived from the singular value decomposition (SVD) of the spatial channel matrix for each bin, $$H(n)=U(n)\Sigma(n)V(n)^H.$$

The input singular matrix, V(n), contains $M_T$ column vectors that define up to $M_T$ TSWs for bin n. Likewise, the output singular matrix, U(n), contain $M_R$ column vectors that when Hermitian transposed, define up to $M_R$ RSW row vectors for bin n. The TSWs and RSWs for other bins are determined in the same fashion, through an SVD decomposition of the spatial matrix for that bin. Using this spatial processing, substantially independent multiple streams of symbols can be transmitted and received. The strength of each subchannel is equal to one of the elements of the diagonal matrix Σ. These subchannels strengths will vary. Therefore, the subchannels will have varying signal to noise ratios and information capacity. For this reason, it may be preferable to transmit and receive only on a subset of the possible subchannels, or M<min{$M_T,M_R$}. For example, it may be improvident to use processing complexity on the weakest subchannels that may have a very small information carrying capacity. In this case, spatial processing is used to increase the received power of one or more parallel symbol streams. It may also be preferable to use coding techniques to leverage strong subchannels to assist in the use of weaker subchannels. It may also be preferable to allocate either bits or transmit power among the subchannels to maximize the amount of information communicated.

The exemplary spatial processing described above requires cooperation between the transmitter and receiver to effectively orthogonalize the spatial channel for each bin. Alternatively, this orthogonalization can be accomplished at only one end of the link. This can be advantageous when one end of the link can afford more computational complexity than the other end. In addition, spatial orthogonalizing at one end can be advantageous when the channel model is known only at that end.

Consider the case where the orthogonalization is done at the receiver. Symbols are transmitted along directions defined by some set of TSWs, v(n,m). When M TSWs corresponding to the sane bin are collected into a matrix V(n), the composite spatial channel is, $$H'(n)=H(n)V(n)$$

This composite channel describes the MIMO channel in bin n from the M-inputs to $M_R$ outputs. The spatial processing at the receiver can substantially orthogonalize this composite channel, H'(n), by applying appropriate RSWs even if the transmitter does no spatial processing. Let these RSWs be defined as the row vectors of the weighting matrix, $W_R(n)$.

Two exemplary methods for determining $W_R(n)$ are referred to as the zero-forcing (ZF) solution and minimum-mean-square-error (MMSE) solution. In the ZF approach, the weighting matrix is the pseduo-(left)-inverse of the composite channel, $$W_R(n)=H'(n)^\perp.$$

This results in, $$W_R(n)H'(n)=I,$$

where the identity matrix is M by M. Hence, the ZF solution, not only orthogonalizes the spatial channel for bin n, but it equalizes the strengths of each resulting subchannel. However, the signal-to-noise ratio for the various subchannels can vary widely. One skilled in the art will recognize that the ZF solution can result in amplification of the interference and noise unless the composite channel, H'(n), is nearly orthogonal to begin with.

An MMSE solution, on the other hand, does not amplify noise. For the MMSE approach, the weight, $W_R(n)$, satisfies, $$\min_{W_R(n)} E\{\|W_R(n)x(n) - z(n)\|^2\},$$

or, $$W_R(n) = R_{z(n)x(n)} R_{x(n)}^{-1},$$

where $R_{x(n)}$ is the covariance matrix for $x(n)$ and $R_{z(n)x(n)}$ is the cross-covariance between $z(n)$ and $x(n)$. Using, $$x(n) = H'(n)z(n) + I'(n),$$

and the fact that $R_{z(n)} = \sigma_z^2 I$, results in the MMSE weight, $$W_R(n) = H'(n)^H \left( H'(n)H'(n)^H + \frac{1}{\sigma_z^2} R_I \right)^{-1}.$$

Note that when $I(n)$ is spatially white noise, then $R_I = \sigma_I^2 I$. Similarly to the above orthogonalization at the receiver, the channel can be orthogonalized at the transmit end only. For this to occur, the transmitter is required to have knowledge of the RSWs to be used by the receiver. In a TDD channel, where the channel exhibits reciprocity, these RSWs can be learned when that transceiver uses TSW directions equal to the RSW directions. Alternatively, the receiver may not do any spatial processing, so the transmitter is responsible for spatial orthogonalization.

In this case, the composite channel is $$H'(n) = U(n)H(n),$$

where the matrix $U(n)$ is composed of the RSW row vectors, $u(n,m)$. This composite channel describes the MIMO channel in bin n from $M_T$ inputs to M outputs. Similar to the previous case, the transmitter can substantially orthogonalize this composite channel, $H'(n)$, by applying appropriate TSWs. These TSWs are the column vectors of the weighting matrix, $W_T(n)$.

The transmit weighting can be determined using the ZF or the MMSE approach. In the ZF approach, the weighting matrix is equal to the pseudo-(right)-inverse of $H'(n)$. The MMSE solution satisfies $$\min_{W_T(n)} E\{\|H'(n)W_T(n)z(n) + I'(n) - z(n)\|^2\},$$

Figure 15:
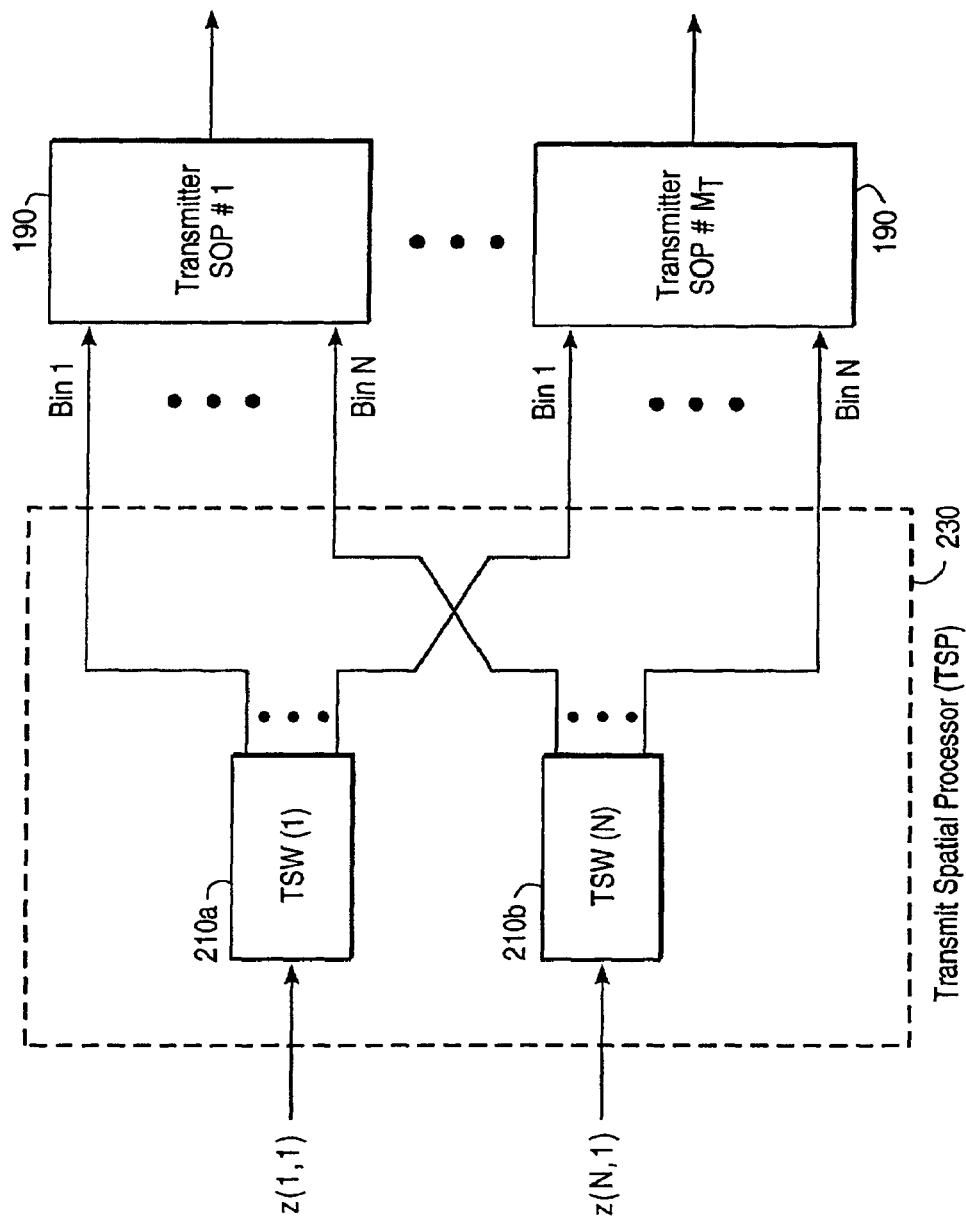
FIG. 15 depicts the use of a single spatial direction at the transmitter end for each bin of an SOP according to one embodiment of the present invention.

An important simplification to the general space-frequency processing technique is the use of only one spatial direction for each bin of the SOP. This case is depicted in FIG. 15 for the transmitter and FIG. 16 for the receiver. In this case, only N subchannels are created. The N input symbols, $z(1, 1)$ through $z(N, 1)$, are processed by N TSWs 210A–B that weight and allocate these N symbols among the $M_T$ identical SOP processors 190. At the receiver, the antenna samples are processed by $M_R$ SOP processors 200. The $M_R$ SOP outputs corresponding to a common bin are weighted and combined in N RSWs 220A-B. With N such weightings, the result is N outputs, $x(1,1)$ through $x(N,1)$, of the N substantially orthogonal subchannels.

When only one spatial direction is used in the TSP and RSP, one exemplary choice for the particular weightings are the TSW and RSW directions that result in maximum subchannel strength. This maximizes the signal-to-noise ratio (SNR) of the received signals, $x(1,1)$ through $x(N,1)$. In this case, the optimal weightings should satisfy, $$\max_{u(n),v(n)} |u(n)H(n)v(n)|^2,$$

with the implicit constraint on the size (2-norm) of both the RSW weight $u(n)$ and the TSW weight $v(n)$. To determine the solution to this optimization problem, consider the SOP outputs for bin n when a single TSW, $v(n, 1)$, is used, $$\begin{bmatrix} x_1(n) \\ \vdots \\ x_{M_R}(n) \end{bmatrix} = H(n)v(n, 1)z(n, 1) = h(n)z(n, 1).$$

The quantity $h(n)$ is referred to as the received channel vector. A channel identification technique is used to determine the received channel vector. Therefore, the optimal RSW weight is equal to the Hermitian of the received channel vector, $h(n)$, $$u(n) = h(n)^H.$$

Note that this is true regardless of the particular value of $v(n)$. The optimal TSW direction, on the other hand, satisfies, $$\max_{v(n)} u(n)H(n)v(n) = \max_{v(n)} v(n)^H H(n)^H H(n)v(n),$$

where the optimal RSW direction has been used. The optimal TSW for bin n is equal to the scaled maximum eigenvector of the matrix $H(n)^H H(n)$. One skilled in the art will recognize that the optimal RSW is also equal to the scaled maximum eigenvector of $H(n)H(n)^H$.

Figure 17:
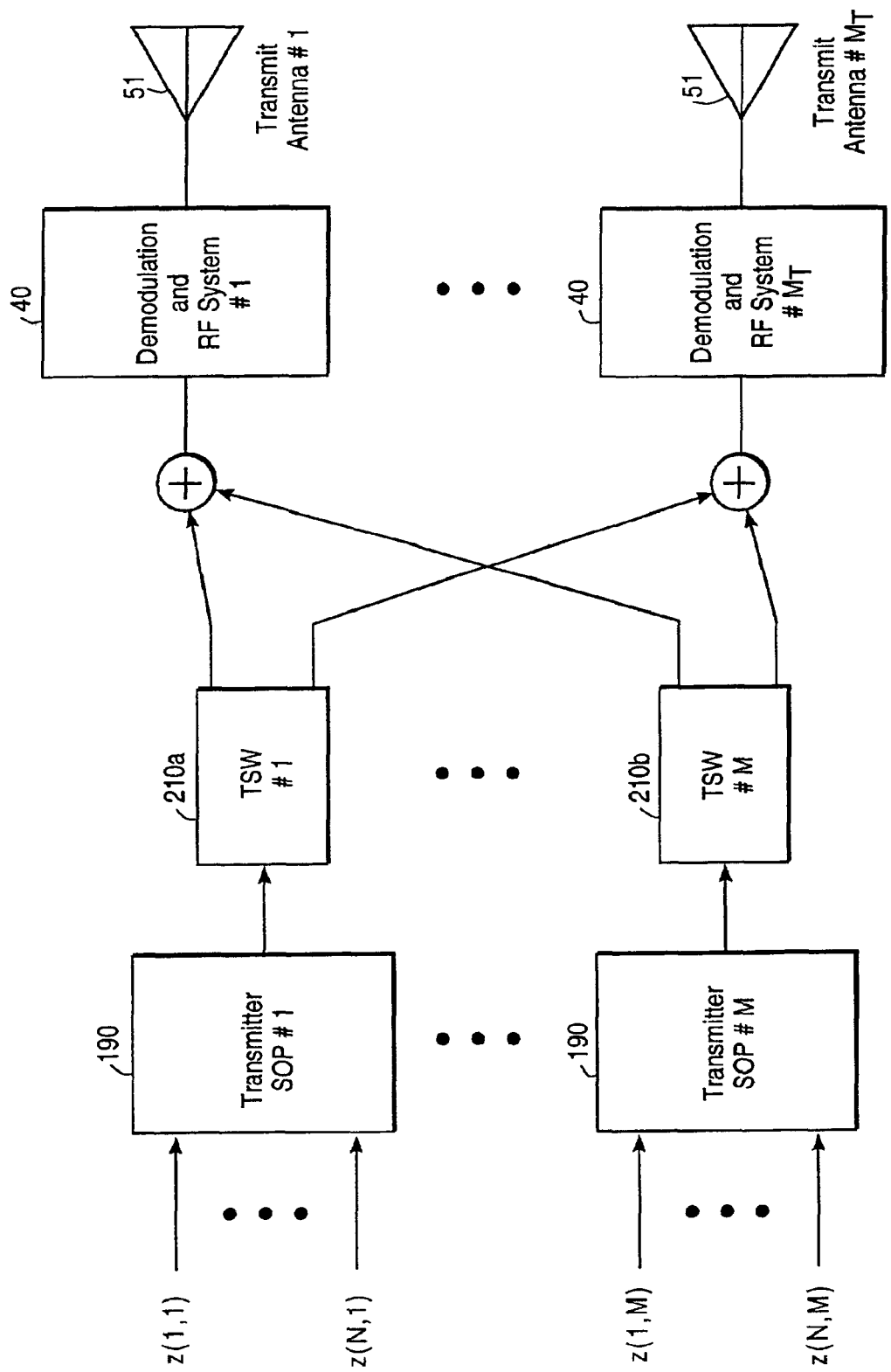
FIG. 17 depicts the use of one or more common spatial weighting vectors for all SOP bins at the transmitter end according to one embodiment of the present invention.
Figure 18:
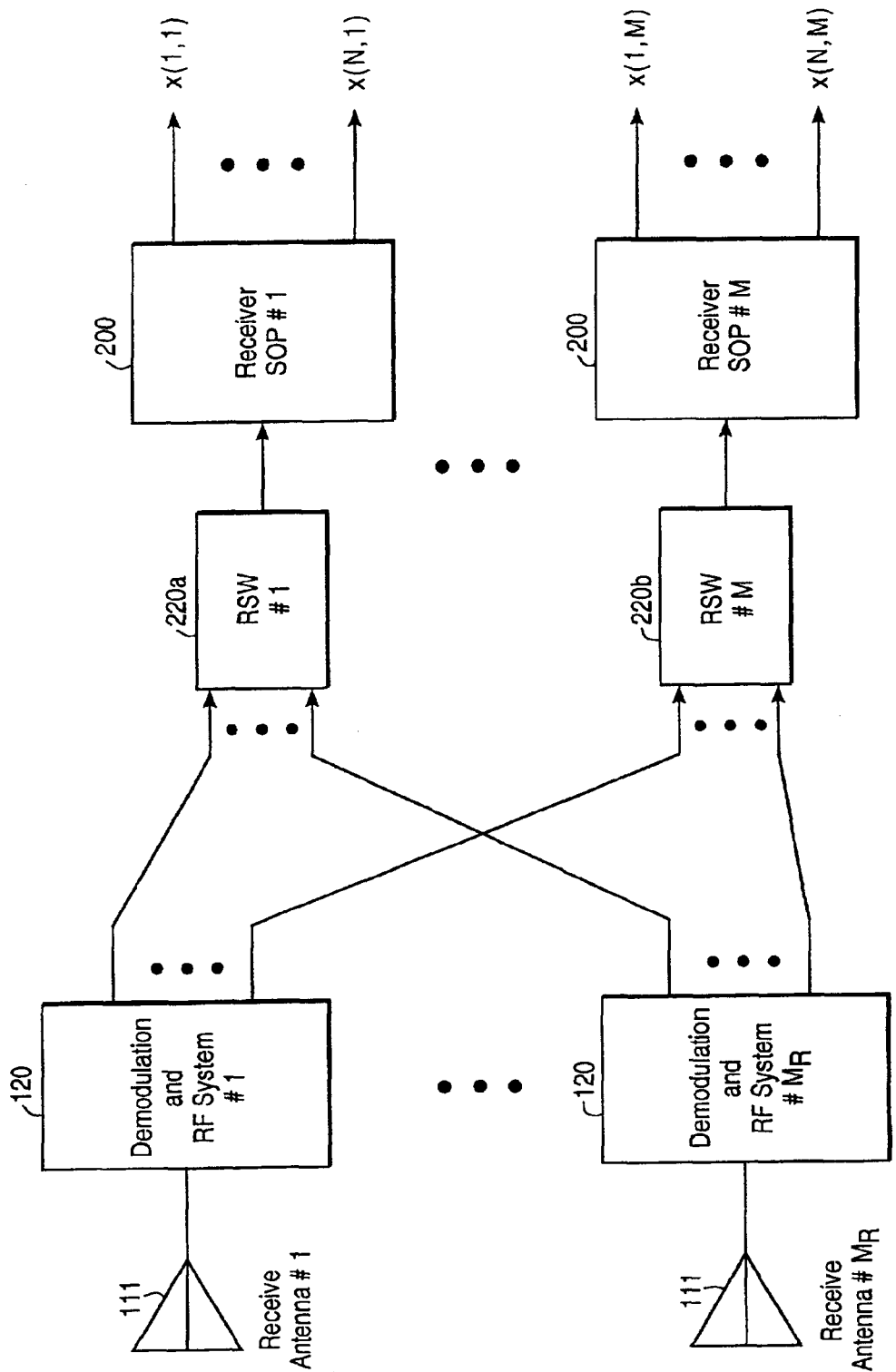
FIG. 18 depicts the use of one or more common spatial weighting vectors for all SOP bins at the receiver end according to one embodiment of the present invention.

A further advantageous simplification of the above techniques is the use of one or more common TSW and RSW directions for all bins. In other words, every bin has the same TSW and RSW weights. These weight vectors may also consider delay elements. In one embodiment, these weights are determined to maximize the SNR of the received signals, averaged over frequency n. This is depicted in FIG. 17 for the transmitter and FIG. 18 for the receiver. Consider this embodiment with one spatial direction. In this case, the TSW and RSW weights satisfy, $$\max_{u,v} E_n[uH(n)v]^2, \qquad 50$$

Note that the expectation operator, $E_n$, represents averaging over SOP bins. This averaging could also be done over multiple bursts in addition to frequency. The solution to this problem is when v is equal to the maximum eigenvector of $$R_d = E_n\{H^H(n)H(n)\} \qquad , 51$$

and u is equal to the maximum eigenvector of the covariance matrix formed from averaging the outer product of the receive vector channel, $$R_h = E^n\{h(n)h(n)^H\}. \qquad 52$$

The quantity $R_d$ is the spatial covariance matrix that describes preferable directions to transmit to the desired receiver, a desired subspace.

This technique can be generalized to the case where multiple directions are utilized. In this case, M TSWs and M RSWs are determined to maximize the average (over bin) SNR received through the M spatial directions. The M spatial directions will not necessarily be orthogonal to each other. Therefore, there will be spatial crosstalk in the received symbols. Multidimensional encoding and decoding techniques discussed below can then achieve a multiplicative rate increase in the presence of such crosstalk.

Alternatively, the receiver can spatially orthogonalize the subchannels by further weighting of the M outputs from the RSWs. The composite spatial channel at bin n, with the RSWs and TSWs included is $$H'(n)=UH(n)V, \qquad 53$$

where the matrix U is made up rows equal to the RSW directions and V is a matrix with columns equal to the TSW directions. Since U and V were determined based on an average SNR criterion for all bins, the composite matrix H'(n) will not be diagonal. Hence, the receiver can apply the additional weight, $W_R(n)$, to orthogonalize H'(n). Alternatively, the transmitter can use the additional weight, $W_T(n)$, to spatial orthogonalize the composite channel. Exemplary solutions for these weightings are the joint SVD, the ZF and MMSE. The advantage of this approach is that the processing required to adapt all N SOP bin matrix channels may be substantially higher than the processing complexity to adapt the average TSP and RSP.

The rejection and prevention of interference can be accomplished in conjunction with the space-frequency processing discussed above. This is especially useful when the number of spatial directions used for communication is less than the number of antennas. This case occurs when weak spatial directions are not utilized or when the number of antennas at the receiver and transmitter are not the same. In either case, one or both ends of the communication link have extra spatial degrees of freedom to use for the purpose of mitigating interference.

The amount of interference arriving at an antenna array can be quantified by the interference covariance matrix, $$R_1(n)=E\{I(n)I(n)_H\},$$

where I(n) is the $M_R$ length interference plus noise vector received in SOP bin n. This matrix defines an undesired interference plus noise subspace in $M_R$-space for bin n. The interference plus noise energy that contaminates a particular received subchannel symbol with bin n and spatial direction m, is equal to, $$u^H(n,m)R_1(n)u(n,m),$$

where u(n,m) is the combining weigh t vector for the RSP(n,m). An advantageous interference rejection technique is then to "whiten" the effect of the interference across the spatial directions, so that the interference is minimized and spread evenly across all spatial directions used. Therefore, each of the RSP weighting vectors are modified by the matrix $R_1^{-1/2}(n)$, $$u'(n,m)=u(n,m)R_I^{-1/2}(n).$$

Alternatively, the RSP weighting vectors are the vectors of the output singular matrix, U'(n), from the SVD of the modified spatial channel, $$R_I^{-1/2}(n)H(n)=U'(n)\Sigma'(n)V'(n)^H.$$

Note that a very useful simplification of the above interference rejection technique is to average the interference covariance matrix over all N bins and possibly a set of bursts to arrive at an average spatial interference covariance matrix, $R_I$, that is independent of bin n. In this case, every RSP combining vector is modified in the same way due to interference. This approach can significantly reduce the amount of computations needed to determine $R_I$ and $R_I^{-1/2}$. Note that it is often beneficial to add a scaled matrix identity tern to estimates of the interference covariance matrix to reduce the sensitivity of these interference mitigation approaches to covariance estimation errors.

Similar interference mitigation techniques can be advantageously employed at the transmitter to reduce the amount of interference radiated to unintentional receivers. In the TDD channel, reciprocity in the radio link allows the undesired receive interference subspace in each SOP bin to be accurately used to describe the transmitter subspace. That is, the amount of interference transmitted to unintentional receivers is $$v^H(n,m)R_1(n)v(n,m), \qquad 60$$

where v(n,m) is the transmit weight vector for the TSW(n, m). An optimal interference reduction approach is then to minimize and "whiten" the transmitted interference across spatial directions. In the same fashion as the receiver case, the TSW vectors are modified by the matrix $R_I^{-1/2}(n)$. Alternatively, the TSP weight vectors are the vectors of the input singular matrix V'(n) from the SVD of the modified spatial channel, $$H(n)R_I^{-1/2}(n)=U'(n)\Sigma'(n)V'(n)^H. \qquad 61$$

Again, a significant simplification occurs when the interference covariance matrix is determined by averaging over frequency or SOP bins. It is especially advantageous to average over SOP bins in a frequency-division-duplex (FDD) system, where significant averaging of the receive covariance matrix results in a good estimate of the transmit covariance, even though instantaneous channel reciprocity does not hold.

Interference rejection at the receiver and interference reduction at the transmitter are done together by simply combining the two techniques outlined above. In this case, the RSP vectors and TSP vectors are contained in the input and output matrices of the SVD of, $$R_{I,R}^{-1/2}(n)H(n)R_{I,T}^{-1/2}(n).$$

As outlined previously, it can be advantageous to use the same TSWs and RSWs for all bins. This approach can be combined with interference mitigation by the determining the transmit and receive weight vectors that maximize average power delivered to the receiver of interest, while at the same time, minimizing power delivered to other undesired receivers. There are various optimization problems that can be posed to determine these TSP or RSP directions, each involving the desired receiver covariance matrix and the undesired covariance matrix. For example, one TSP problem is $$\max_{v} v^H R_d v$$

such that $v^H R_I v \leq P_I$ and $v^H v \leq P_T$.

That is, a TSP direction is chosen for all SOP bins that transmits the maximum amount of power to the desired receiver while maintaining a transmit power limit, $P_T$, and a transmitted interference limit, $P_I$. For this particular problem, the TSP direction is equal to the maximum generalized eigenvector of the matrix pair $\{R_d,(R_I/P_I+I/P_T)\}$.

One example of an effective interference rejecting RSP for all SOP bins is a weighing that maximizes the average received SINR. The RSP that maximizes SINR is the maximum eigenvector of the matrix $R_I^{-1/2} R_d R_I^{-1/2}$.

One further simplification to the above algorithm is to model the interference and/or the desired covariance as diagonal, or nearly diagonal. When both $R_d$ and $R_I$ are diagonal, the solution to the above optimization problem reduces to the maximal ratio SINR combiner, u, and transmitter, v. It is also sometimes preferable to only consider other subsets of the elements of either the desired or interference covariance matrices.

One skilled in the art will also recognize that all the TSPs and RSPs can be used when there is only one SOP bin, such as a common frequency.

Space Frequency Coding

Many of the advantageous space frequency encoding techniques embodied in the invention may be broadly classified in two exemplary categories. The first category involves techniques wherein the spatial matrix channel within each SOP bin undergoes space frequency processing at the transmitter, or the receiver or both, resulting in a substantially independent set of one or more parallel communication subchannels within each SOP bin. The objective of the encoder and decoder in this case is to appropriately allocate the transmitted information among multiple independent space-frequency subchannels using interleaving, power and bit loading, or both. The second category of space frequency encoding involves transmitting and receiving one or more symbol sequences in each SOP bin using one or more transmitter and receiver weight vector combinations that are not necessarily intended to create independent spatial subchannels within each SOP bin. This results in significant cross-talk between each symbol stream present at the receiver output. A decoder then uses knowledge of the equivalent matrix channel within each SOP bin, and knowledge of the set of possible encoder sequences to estimate the encoder symbol sequence that gave rise to the cross-talk rich output SOP bin vector sequence. The main differentiating feature between the first approach and the second approach is the presence or lack of spatial processing that results in substantially orthogonal spatial subchannels within each SOP bin. Both approaches have the advantageous ability to multiply the data rate that can be achieved in MIMO channels with multipath.

Coding for Substantially Orthogonal Space-Frequency Subchannels

Figure 22:
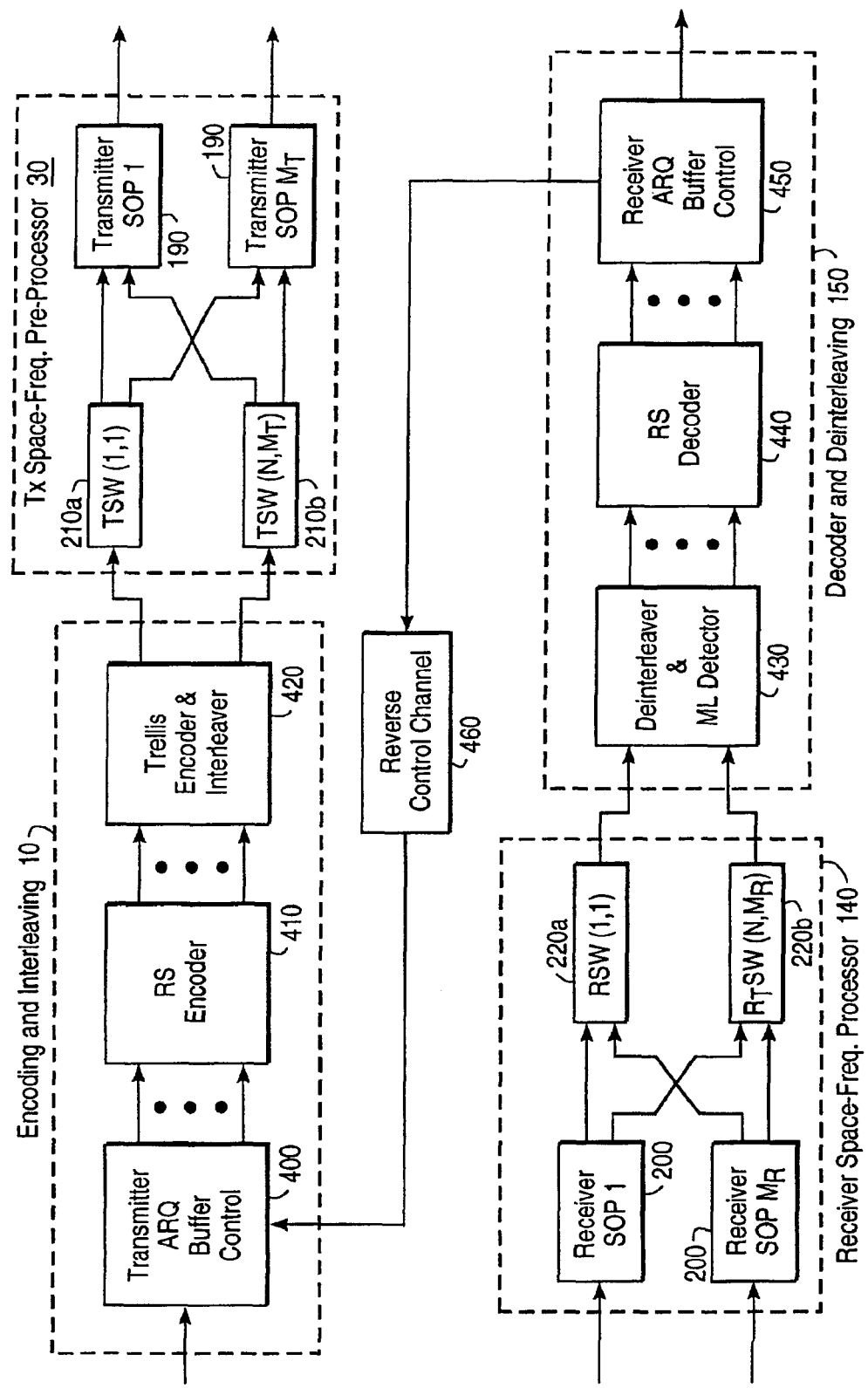
FIG. 22 depicts distribution of encoder output over all space/frequency subchannels according to one embodiment of the present invention.

In applications where the spatial channels are processed to achieve multiple substantially independent spatial subchannels within each SOP bin, an advantageous embodiment of the invention involves encoding the input data sequence into a digital symbol stream that is then routed in various beneficial ways through the available parallel space frequency subchannels. FIG. 22 depicts a preferred embodiment. This embodiment involves distributing the symbol outputs of a single encoder among all of the available space frequency subchannels. Several known coding schemes that can be combined effectively with space frequency processing to distribute information transmission over the space and frequency dimensions of a communication channel. This discussion assumes estimation of the MIMO channel by transmitting a series of training symbol sequences from each antenna element as discussed herein. The discussion further assumes that the receiver and transmitter either share the information required to decompose the channel into parallel sub-channels, or the TDD techniques discussed herein are used to do the same.

Referring again to FIG. 22, the preferred embodiment exploits a three layer coding system. The first layer of coding includes the combination of transmitter TSWs 210A through 210B, Transmitter SOP processors 190, receiver SOP processors 200, and receiver RSWs 220A through 220B. This first layer of coding performs the spatial processing. The second layer of coding includes a Trellis Encoder and Interleaver (420) at the transmitter in combination with a Deinterleaver and ML Detector 430 at the receiver. The third layer code involves Reed Solomon (RS) Encoder 410 at the transmitter in combination with an RS Decoder 440 at the receiver. The bit level RS coding occurs prior to the trellis encoding and the Reed Solomon codeword detector acts upon the bit sequence from the ML detector. The fourth layer of coding involves an ARQ code that recognizes Reed Solomon codeword errors at the receiver in the Receiver ARQ Buffer Control 450 and requests a codeword retransmission from the Transmitter ARQ Buffer Control 400. The retransmission request is made through a Reverse Link Control Channel 460. The reverse control channel is a well known radio system concept and will not be discussed herein. This combination of coding techniques and space frequency processing is preferable because it provides for a rich combination of space and frequency diversity and it is capable of obtaining very low bit error rates. The detailed operation of the RS encoder and decoder, as well as the ARQ system is well known to one skilled in the art. Following this discussion, it will be clear to one skilled in the art that other combinations of one or more of these four coding elements may be employed with advantageous results in various applications.

The trellis coding step may be substituted with CBM-QAM or a turbo code. Similarly, the Reed-Solomon code may be substituted with a block code, or with an error checking code such as a CRC code. The transmitter end would then include the necessary encoder and the receiver end would include the necessary decoder.

There are at least two basic methods for employing trellis coding to distribute information among substantially independent space frequency subchannels. One method is adaptive encoding that modifies the bit and power loading for each subchanel according to its quality. The second method involves maintaining constant power and bit loading for all space frequency subchannels. Both of these methods are discussed below.

Space Frequency Trellis Coding with Orthogonal Spatial Subchannels and Adaptive Power and Bit Loading FIG. 22 depicts the coding and interleaving detail for the transmitter and receiver portions of the present embodiment. Encoding and Interleaving system 10 encodes the data into a set of complex symbols. Each of the complex symbols is then allocated to a particular transmitter TSW (210A through 210B). The input to each TSW forms a vector of frequency domain symbols that are fed into the same bin of one or more transmit SOP processors. Each transmitter TSW, possibly in conjunction with a receiver RSW converts the matrix channel within each SOP bin into a set of substantially orthogonal space frequency subchannels using one of the methods discussed herein.

Figure 23:
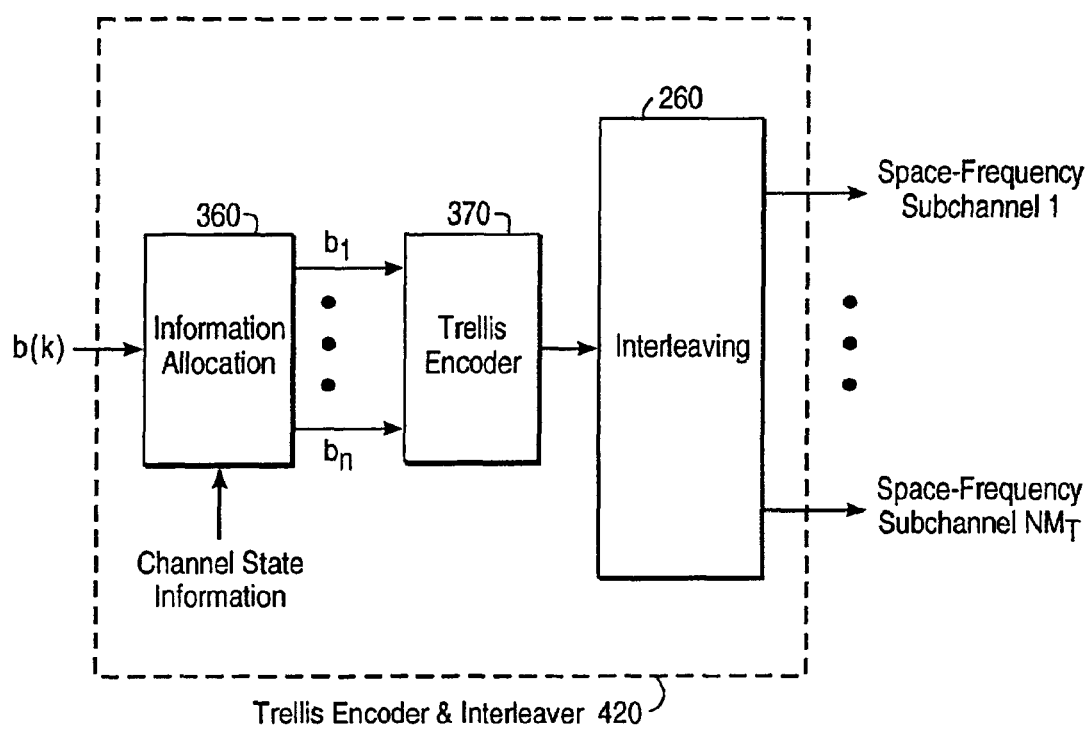
FIG. 23 depicts a detailed diagram of an encoder/interleaver system according to one embodiment of the present invention.

FIG. 23 displays a more detailed diagram of the encoder and interleaver. An Information Allocation Unit 360 assigns the bits and the transmitter power that will be allocated to each space frequency subchannel. One method for accomplishing this assignment is the so-called gap analysis. In this technique, a particular coset code with an associated lattice structure is characterized by first determining the SNR required to achieve a theoretical capacity equal to the desired data rate. The code gap is then the SNR multiplier required to achieve the target probability of error at the desired data rate. In a parallel channel communication system, this gap can be used to determine the power and bit distributions that maximize data rate subject to a probability of error constraint With a coding gap of α, the rate maximizing water-filling solution for the space frequency subchannels becomes $$p(n, m) = \left(\xi - \frac{\sigma_n^2 \alpha}{|\lambda(n, m)|^2}\right)^+,$$

where $\sigma_n^2$ is the noise power and m is the spatial index and n is the DFT frequency index.

The bit allocation per sub-channel is then given by $$b(n, m) = \log\left(1 + \frac{p(n, m) \cdot |\lambda(n, m)|^2}{\alpha \sigma_n^2}\right).$$

After the power and bit loading assignments are accomplished in the Information Allocation Unit, the bits are encoded with a Trellis Encoder 370. It is not possible to achieve infinite bit resolution (granularity) with coset codes. Therefore the gap analysis solution should be modified. Several bit loading algorithms exist to resolve this problem. One method involves rounding down the water filling solution to the nearest available quantization. The granularity of possible bit allocations is determined by the dimensionality of the coset code lattice structure. In the MIMO channel communication structures described herein, the orthogonal constellation dimensions are the complex plane, space, and frequency.

Figure 26:
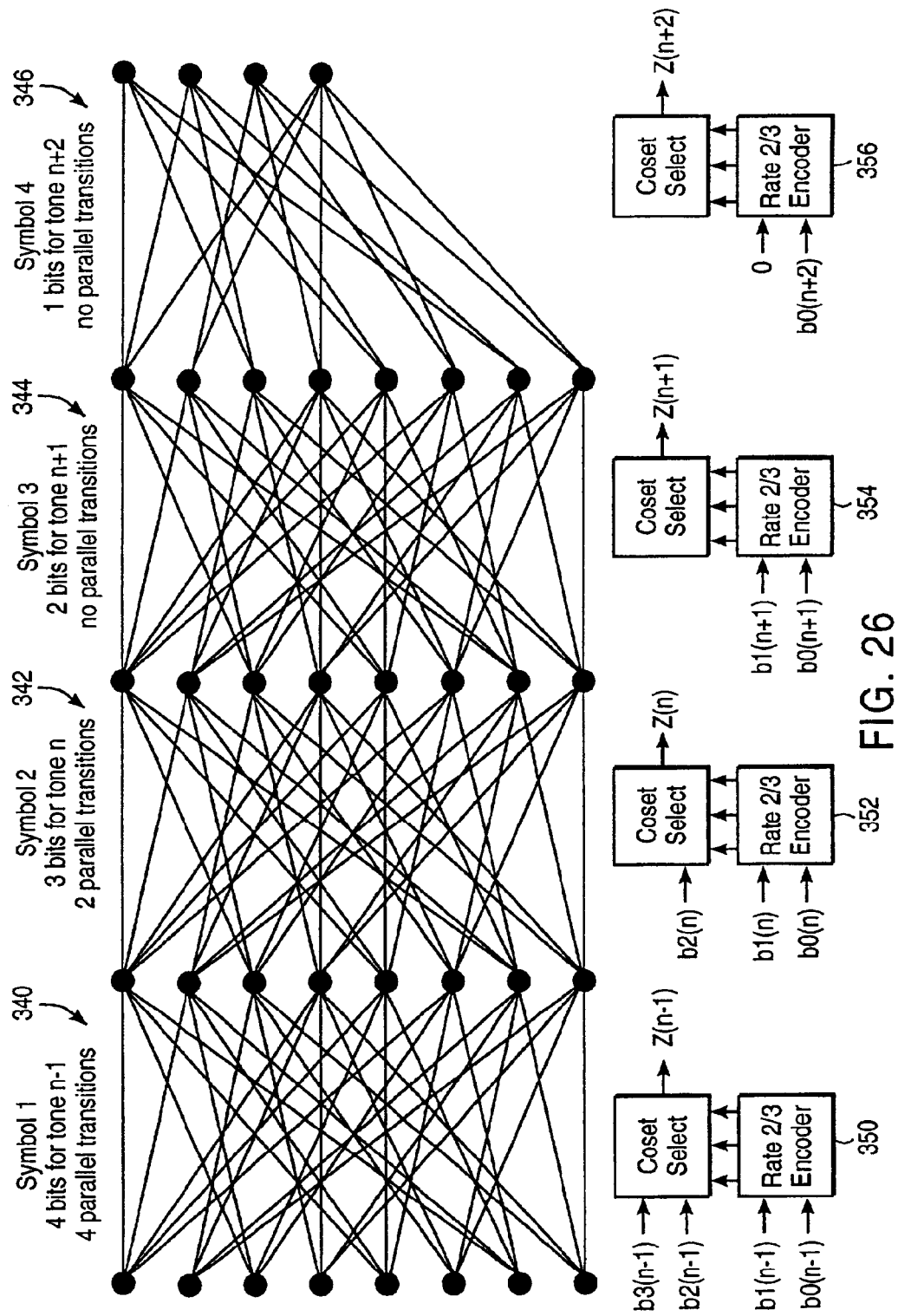
FIG. 26 depicts an exemplary technique for bit loading with a trellis coder that uses a one-dimensional QAM symbol constellation.

FIG. 26 illustrates an example of a practical method for bit loading with a trellis encoder that uses a one dimensional QAM symbol constellation. The bit load is adjusted down for a given trellis encoder output symbol by assigning a number of fixed zeros to one or more of the input bits to the encoder. FIG. 26 shows the operation of the trellis encoder and the trellis state diagram for the decoder for four successive symbol transmissions. Four bits are assigned to the first space frequency subchannel. A first subchannel trellis encoder input 350 is assigned 4 bits so Symbol 1 can take on any one of 32 values. There are two bits feeding the convolutional encoder, and two bits feeding the coset select. The ML detector at the receiver uses the trellis state diagram and the channel state information to solve the maximum likelihood recursion. This is efficiently accomplished with the Viterbi algorithm. The trellis code state diagram defines a set of symbol sequence possibilities {Z}. The space frequency subchannel is denoted Ĥ(n,k), for SOP bin n at burst k. The maximum likelihood equation is then given by $$\{\hat{z}(1)^T, \hat{z}(2)^T, \ldots, \hat{z}(N)^T\} = \arg\left\{\min_{z=\{z(1)^T, z(2)^T, \ldots, z(N)^T\}} \sum_{n=1}^{N} |\hat{H}(n, k)z(n) - x(n, k)|^2\right\}$$

where z(n) is the symbol hypothesized for SOP bin n. The decoder output state diagram for first space frequency subchannel 340 includes four possible parallel transitions for each trellis branch and all of the trellis branches are possible. The second space frequency subchannel in the sequence is assigned three bits so a second trellis encoder input 352 shows one bit fed into the coset select with two bits still feeding the convolutional encoder. A decoder state diagram 342 for the second space frequency subchannel has only two parallel transitions for each trellis branch but still maintains all trellis branch possibilities. Continuing in succession, a third space frequency subchannel is assigned only two bits to an encoder input 354 so there are no parallel transitions considered by a trellis decoder state diagram 344. In a fourth space frequency subchannel, only one bit is assigned to an encoder input 356 so there are no parallel transitions and some of the trellis state branches (346) are no longer considered by the decoder. It is understood that FIG. 26 is provided as a graphical aid and is not intended to represent an actual design.

The maximum Euclidean distance error sequence design metric is one preferable choice for a trellis encoder used with the parallel space frequency channel with this bit and power loading embodiment of the invention. Other code error sequence design metrics that are advantageous in various application conditions include product distance and periodic product distance.

Referring again to FIG. 23, the output of the encoder is interleaved across the various space frequency subchannels using Interleaving block 260. Typically, the interleaving process distributes the symbols so that symbols that are near one another at the encoder output are well separated in both the SOP bin assignment and the spatial subchannel assignment. This distributes the effects of channel estimation errors and localized frequency domain or spatial domain interference so that the decoder error is reduced. It is understood that the bit and power assignments by Information Allocation block 360 take place with knowledge of the post-interleaved channel strength. It is understood that the encoding and decoding process can begin and end within one burst, or it may take place over a multitude of bursts.

One skilled in the art will recognize that a multitude of less sophisticated adaptive power and bit loading algorithms can be advantageously applied to a substantially independent set of space frequency subchannels. One example is an algorithm wherein a space frequency subchannel is either loaded with maximum power or no power and the bit distribution may be adjusted in only two increments.

Figure 19:
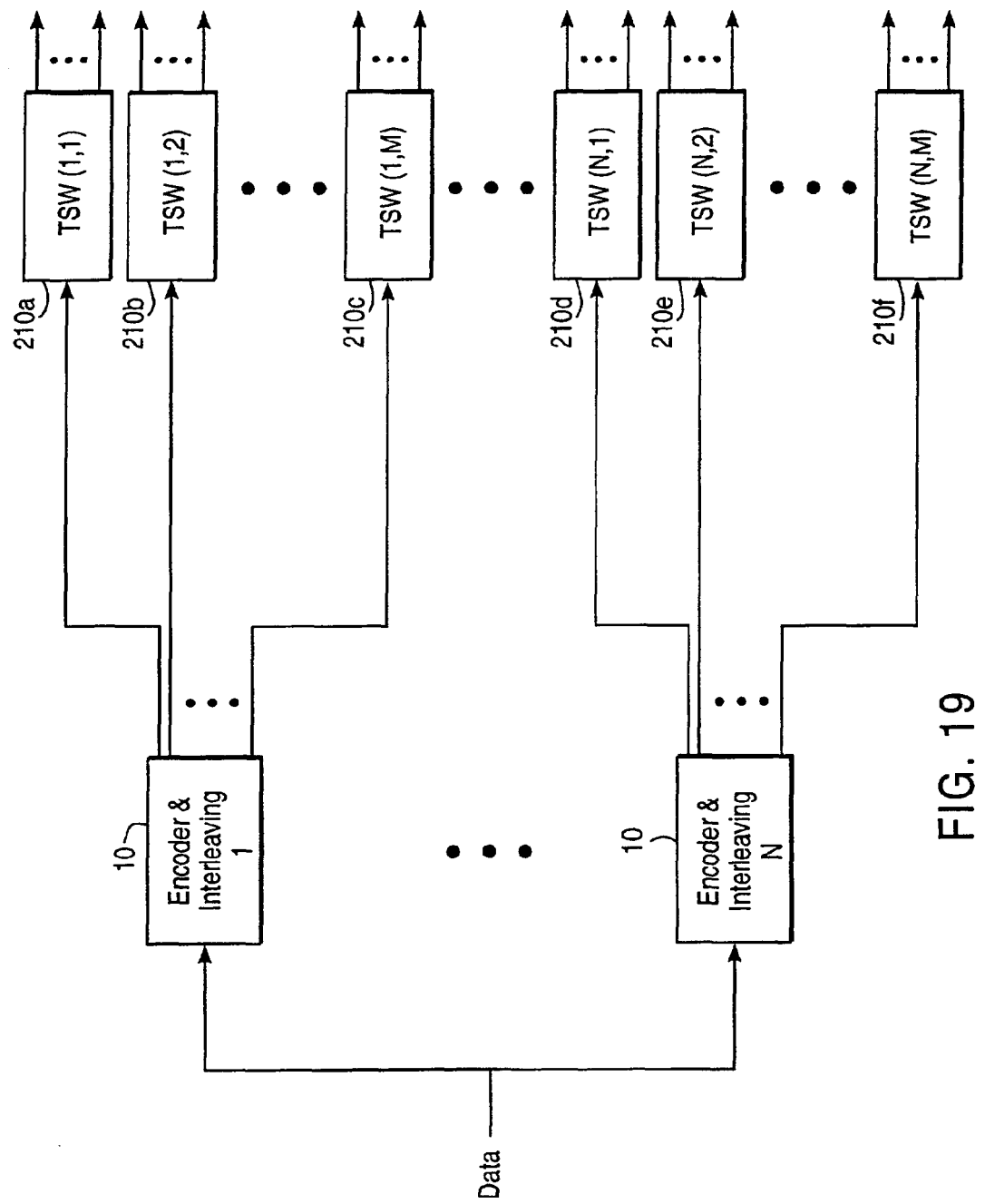
FIG. 19 depicts the use of an encoder for each SOP bin according to one embodiment of the present invention.
Figure 20:
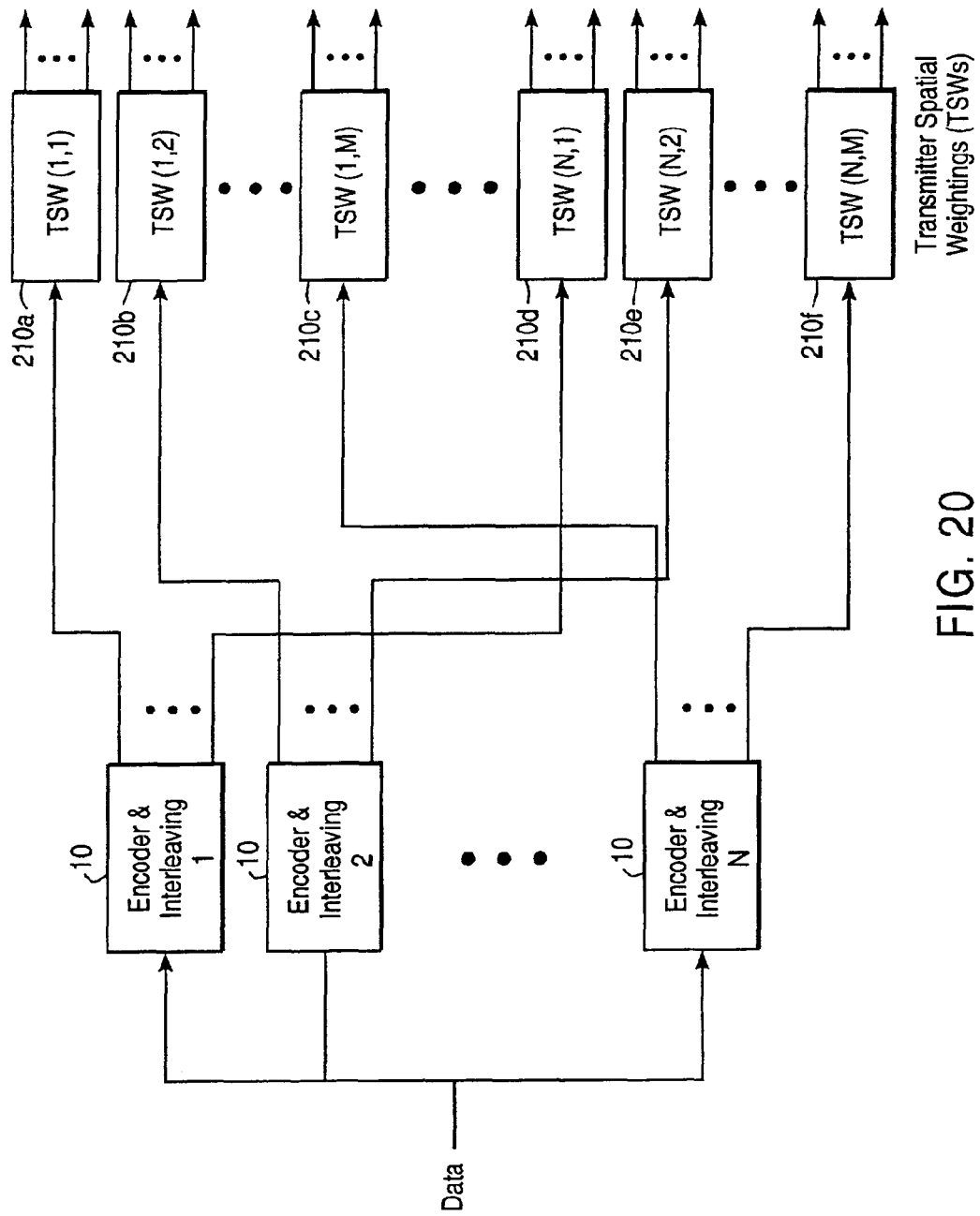
FIG. 20 depicts the use of an encoder for each spatial direction according to one embodiment of the present invention.
Figure 21:
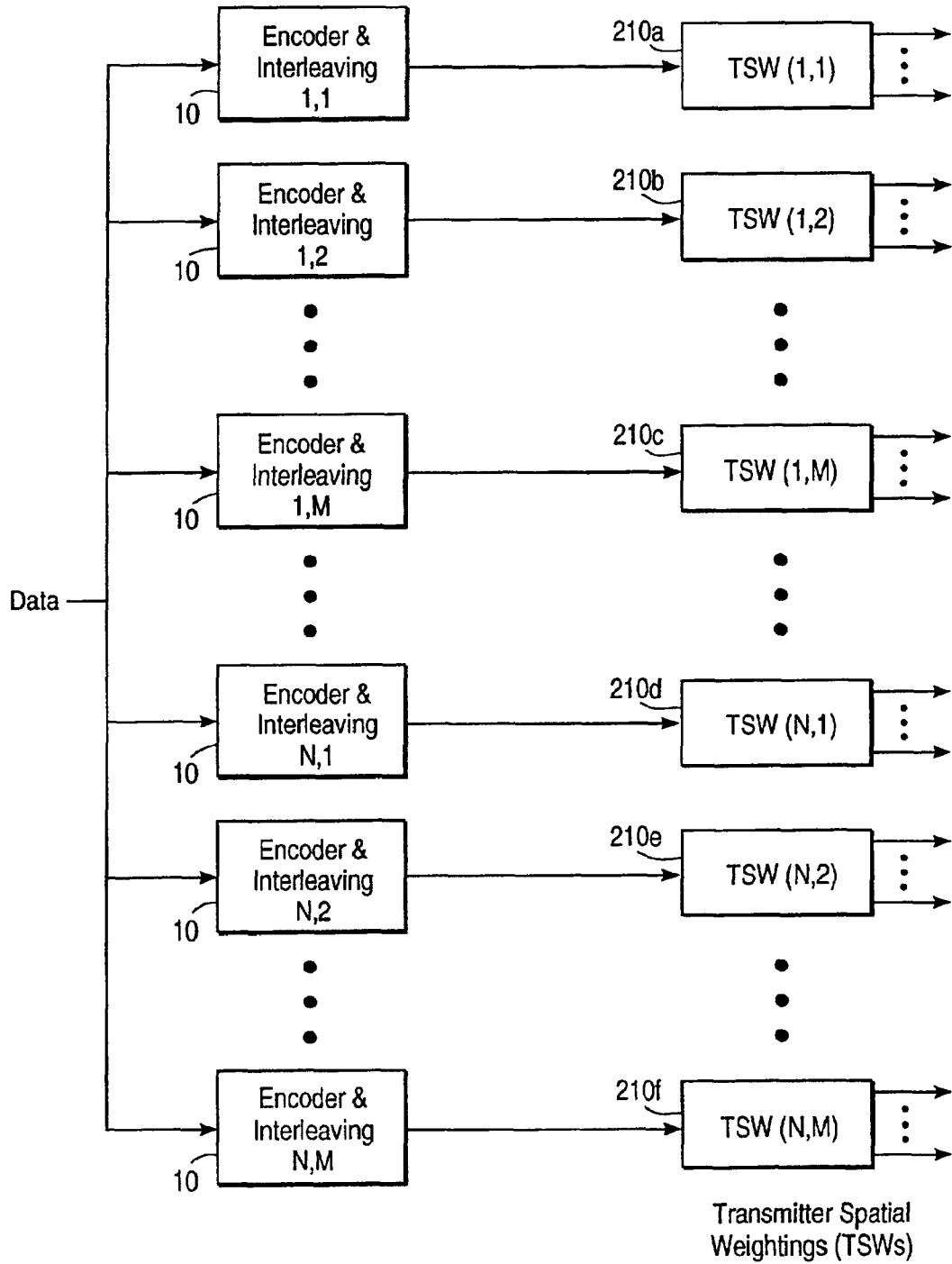
FIG. 21 depicts the use of an encoder for each space/frequency subchannel according to one embodiment of the present invention.

A second alternative embodiment shown in FIG. 19 includes one encoder for each SOP bin, with the output symbols of each encoder allocated among several spatial subchannels. A third embodiment shown in FIG. 20 involves one encoder for each spatial subchannel, with the output symbols of each encoder distributed among the SOP bins for that spatial subchannel. A fourth embodiment shown in FIG. 21 involves a separate encoder for each available space frequency subchannel.

It will be clear to one skilled in the art that the channel estimation tools taught herein are very useful in improving the accuracy of the channel estimates used for the bit loading and decoding process.

One skilled in the art will recognize that many of the other coding techniques for parallel sub-channel bit loading communication systems, not mentioned here, can also be applied to the present invention.

Space Frequency Trellis Coding with Orthogonal Spatial Subchannels and Flat Power and Bit Distribution In some cases it is difficult to adaptively load the power and bit assignments for each available space frequency subchannel. For example, the transmitter and receiver may not be able to adapt the loading fast enough to accommodate time domain variation in the channel. In another example, the required feedback from the receiver to the transmitter requires a significant portion of the available reverse link bit rate. Adaptive bit loading may also be overly complicated for certain applications. Thus, it is often advantageous to encode and decode a symbol stream in such a manner that the power and bit allocation is constant for all space frequency subchannels. This is easily accomplished by employing the embodiments depicted in FIGS. 22-23, and assigning a constant power and bit allocation to all space frequency subchannels in the Information Allocation block 360.

Space Frequency Coding Without Orthogonal Spatial Subchannels

In applications where the spatial channels are not processed to achieve substantially orthogonal spatial subchannels within each SOP bin, an advantageous embodiment of the invention involves utilization of a vector maximum likelihood decoder in the receiver to decode a symbol sequence that includes multiple symbols per SOP bin. The vector maximum likelihood detector is capable of determining the transmitted symbol vector in each SOP bin even in the presence of spatial subchannels that contain significant cross-coupling between the channels. The vector maximum likelihood detector uses an estimate of the matrix channel from each SOP bin to decode a sequence of groups of symbols with one group for each SOP bin. The groupings will be referred to here as a multidimensional symbol vector, or simply a symbol vector. The ML detector uses an estimate of the matrix channel that exists in each SOP bin to find the most likely sequence of transmitted encoder vector symbols.

Figure 24:
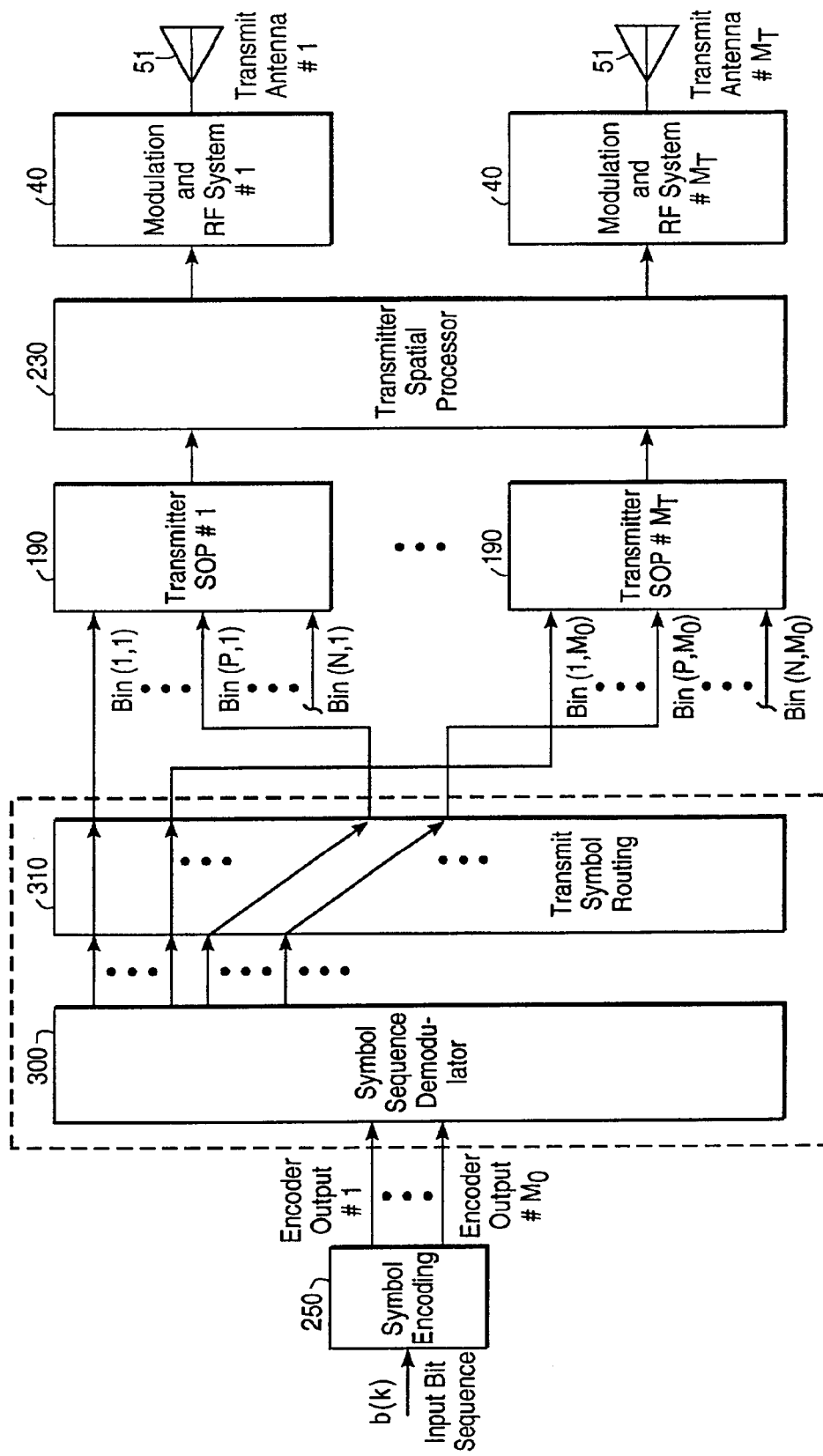
FIG. 24 depicts a transmitter system wherein multiple space/frequency subchannels are employed without spatial orthogonalization according to one embodiment of the present invention.
Figure 25:
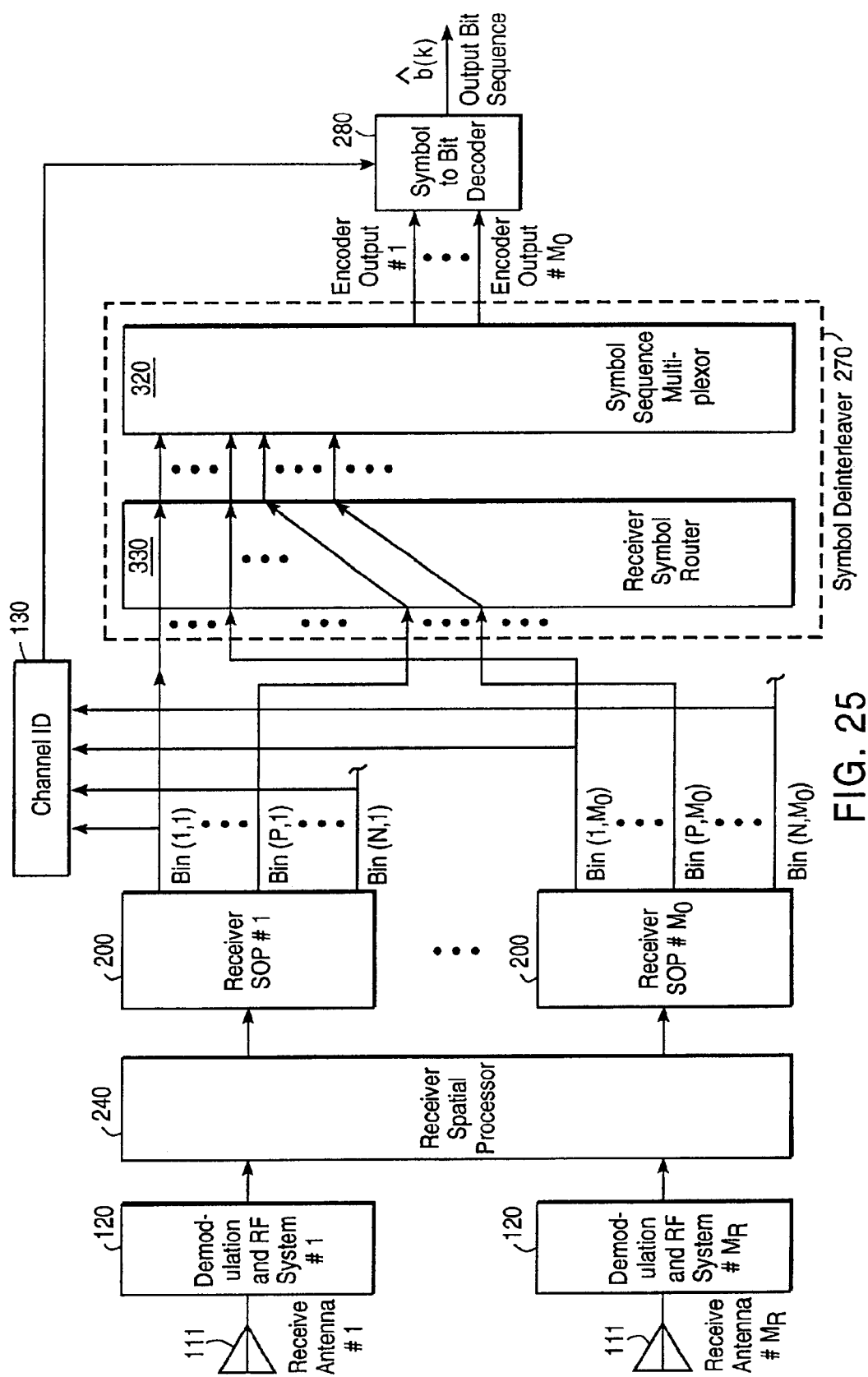
FIG. 25 depicts a receiver system wherein multiple space/frequency subchannels are employed without spatial orthogonalization according to one embodiment of the present invention.

FIG. 24 depicts a transmitter system wherein multiple space/frequency subchannels are employed without spatial orthogonalization. FIG. 25 depicts a receiver system for this application.

The bit sequence b(k) is encoded into a sequence of multidimensional symbol vectors in a Bit to Symbol Encoding block 250. Each output of the encoder is an $M_0$ by 1 complex symbol vector, where $M_0$ is the number of spatial directions that will be used for transmission. Note that $M_0$ is preferably chosen to be less than or equal to $M_T$. A preferable construction of the encoder is a multidimensional trellis encoder. One advantageous metric for designing the trellis encoder constellation and convolutional encoder polynomial will be provided below. Within the previously discussed Symbol Interleaver block 260, the vector symbol sequence is demultiplexed and interleaved with a Symbol Sequence Demultiplexor 300 and a Transmit Symbol Routing block 310. Transmit Symbol Routing block 310 interleaves the vector symbol sequence so that the elements of a given vector symbol are grouped together and transmitted in one SOP bin. Thus, different vectors are separated by a multitude of SOP bins before transmission, but all elements within the vector symbol share the same SOP bin. The purpose of the interleaver is to distribute the vector symbol sequence so that the fading present in the matrix channels within the SOP bins is randomized at the output of the receiver interleaver. The decoder can recover information associated with symbols that are transmitted through SOP bins that experience a deep fade, provided that the adjacent symbols do not also experience the same fade. Since there is often a high degree of correlation in the fading experienced by adjacent SOP bins, the interleaver makes the fading more random and improves decoder error performance. After interleaving, each element of a vector symbol is assigned to one antenna for the SOP bin assigned to that vector symbol. Transmitter SOP processors 190 perform the transmitter portion of the SOP.

After the transmitter SOP, it is often advantageous to perform spatial processing with TSP 230. It is understood that the matrix representing the operation of TSP 230, i.e., the Transmitter Weight Matrix, may also be an identity matrix so that no weighting is implemented. It can be beneficial to choose a number of spatial directions that is less than the number of transmitter antennas. In this case, the Transmitter Weight Matrix increases the dimensionality of the time domain vector sequence from the SOP bank. As an example of when it is advantageous to choose a subset of the available transmitter spatial directions, if the receiver has fewer antennas than the transmitter, then it is known that the information capacity of the matrix channels within each SOP bin will not support a number of parallel information subchannels that is greater than the number of receive antennas. This implies that the number of symbols in each transmitted symbol vector, and hence the number of transmitted spatial directions, should not be greater than the number of receiver antennas. As another example, in a Rayleigh fading channel, the smallest singular values of an $M_R$ by $M_T$ matrix channel are on average much weaker than the largest singular value. This implies that the average information capacity contained in the smallest singular value may not justify the extra signal processing complexity required to transmit over that dimension. In both of these cases, it is advisable to choose an advantageous subset of the available transmit spatial directions.

The transmitter may not have knowledge of the individual channel matrices within each SOP bin but may have knowledge of the covariance statistics of the channel matrices, averaged over frequency, or time, or both. In such cases, the Transmitter Weight Matrix can be optimized to select one or more spatial directions that maximize the average received power for the chosen number of spatial directions. The procedure for optimizing the Transmitter Weight Matrix for this criteria is defined by Equations 50 to 52 and the associated discussion. This is one preferred method of selecting an advantageous set of spatial directions for the Transmitter Weight Matrix. Another advantageous criteria for selecting the transmitter spatial directions is to maximize average received power subject to constraints on the average interference power radiated to unintentional receivers. The procedure for optimizing the Transmitter Weight matrix for this criterion is defined by Equations 60 and 61 and the associated discussion.

After the time domain signal is spatially processed, the signal is upconverted to the RF carrier frequency using Modulation and RF System 40 before being radiated by Transmit Antennas 51. Referring now to FIG. 25, at the receiver the signal is downconverted and digitized by Receive Antennas 111 and Demodulation and RF System blocks 120. The RSP 240 may then be used to process the time domain signal. The operation of RSP 240 may be characterized by a Receiver Weight Matrix which may be an identity matrix. One embodiment involves optimizing the RSP weights to reduce the number of received signals from $M_R$ to $M_0$, which is the number of elements in the transmitted symbol vector and is also the number of transmitted spatial directions. In this case, the Receiver Weight Matrix can be optimized to increase the average signal power in each received spatial direction. The optimization procedure to accomplish this is defined by Equations 50 to 53 and the associated text.

Channel ID block 130 is used to estimate the matrix channel in each SOP bin. Procedures for channel estimation are described below. Channel state information for each SOP bin is fed into a Symbol to Bit Detector 280 which decodes the symbol sequence after it is passed through a Symbol Deinterleaver 270.

At the receiver, after de-interleaving the SOP bins, the space-frequency sequence is again converted into a serial symbol stream by Demultiplexor 300. For a given set of spatio-temporal vector symbol sequence possibilities {Z}, and an estimate, $\hat{H}(n,k)$, of the channel matrix in each SOP bin n at burst k the maximum likelihood detector is given by equation (70):

$$\{\hat{z}(1)^T, \hat{z}(2)^T, \ldots, \hat{z}(N)^T\} = \arg\left\{\min_{z=\{z(1)^T,z(2)^T,\ldots,z(N)^T\}} \sum_{n=1}^{N} \left\|R_i(n,k)^{-1/2}\left(\hat{H}(n,k)z(n) - x(n,k)\right)\right\|_2^2\right\}$$

where z(n) is the vector representing the code segment hypothesized for SOP bin n, and $R_f(n,k)$ is the estimated noise plus interference covariance matrix for SOP bin n and time k. This equation can be solved efficiently using a vector ML detector. The SOP bin channel matrix estimates are understood to include the effects of the Transmitter Weight Matrix and the Receiver Weight Matrix. It is understood that the noise pre-whitening step in the ML detector cost function can be substituted by a bank of RSPs that perform the interference whitening as described herein.

In a Rayleigh fading channel, a desirable metric for designing the trellis code is given by the product of a sum involving the two-norm of vector segments of the trellis code error sequence:

$$\prod_{n=1}^{q} \|e(n)\|_2^2$$

where q is the number of SOP bins in the error sequence, and e(n) is the vector difference between the true multidimensional code symbol segment and the incorrect multidimensional symbol code segment for SOP bin n. This code design metric is a generalization on the conventional product distance metric which contains a scalar error entry in the product equation while the new code design metric contains a vector two norm entry in the product equation. It should now be evident that the multidimensional encoder can be realized by either directly producing a vector consisting of a multidimensional QAM symbol with the encoder output or by grouping complex QAM symbols from a one dimensional encoder output into a vector. The vector symbol encoder alternative is preferred in some cases because this approach provides for a larger metric search result and hence a better fading code. After deinterleaving, the decoder that is used at the receiver searches over all possible multidimensional symbols within each SOP bin to maximize Equation 70. It is understood that one skilled in the art will recognize after this discussion that other desirable metrics such as Euclidean distance metrics, metrics designed for Rician fading channels, periodic product distance metrics, and others are straightforward to construct and space-frequency codes can then be determined through well known exhaustive search techniques.

In either the one dimensional encoder case, or the multidimensional encoder case, the encoder constellation selection and code polynomial search to maximize the metric can be carried out using a number of well known procedures.

It is possible to improve the performance of the space-frequency coding system described above by using a number of transmitter antennas, or a number of receiver antennas, that is greater than the number of symbols transmitted in each SOP bin. If the number of receiver antennas is greater than the number of symbols in each SOP bin, then simply applying the approach described above is advantageous. If the number of transmitter antennas is greater than the number of symbols transmitted in each SOP bin, then the techniques embodied in Equation 70 are advantageous.

Channel Identification

The operation of Channel Identification block and Training Symbol Injection block 20 will now be described. The transceiver should determine the MIMO channel in order to form the TSWs and RSWs. For coherent spatial processing and detection, the receiver should obtain an estimate of the channel. We wish to identify the set of matrix channels that results after processing by the transmitter and receiver portions of an SOP. The notation for this channel is $H(n)\forall n$ where n is the SOP bin index. Channel identification techniques embodied herein can be applied to several preferable SOP pairs including the IFFT-FFT with cyclic prefix, the multiband filter bank, or any other of a number of well-known SOPs. The following exemplary channel identification approach exploits the correlated frequency fading across and possibly the correlated time fading in the channel. The correlation in the frequency domain arises due to the limited time delay spread of the multipath channel. The correlation in time is due to the fact that the channel, while time-varying, is driven by band-limited Doppler frequencies created by objects, which can include the transmitter and/or receiver, moving in the physical environment.

The wireless link is bidirectional, therefore each end of the link should estimate not only a receive channel, but also a transmit channel. For example, a base station should estimate both an uplink and downlink channel. In systems which employ time division duplexing (TDD), electromagnetic reciprocity implies the receive and transmit propagation environments are the same, allowing the transmit channel to be estimated from the receive channel. However, the transmit and receive electronic responses are not necessarily reciprocal, and because the net channel response includes the electronics, a calibration procedure should be used to account for these differences. This calibration procedure provides for matching in the amplitude and phase response between the multiple transmitter and receiver frequency converters. Several TDD calibration procedures are known in the prior art and will not be discussed herein.

In systems employing frequency division duplexing (FDD), the propagation medium is not reciprocal; however, the paths' angles and average strengths are the same for transmit and receive. This enables the use of subspace reciprocity, but incurs a more rigorous calibration requirement. The FDD calibration should insure subspace reciprocity which requires that the array response vector at a given angle on receive is proportional to the corresponding vector on transmit. This requirement is satisfied by again calibrating the amplitude and phase differences among the multiple transmit and receive frequency converter channels and by matching the transmit and receive antenna element response as well as the array geometry.

An alternative approach to transmit channel estimation in FDD systems uses feedback. The transmit channel is measured by sending training symbols to the receiver, which records the amplitude induced by the training symbols. Using receiver to transmitter feedback on a separate feedback control channel, the training responses are sent back to the transmitter. The transmitter, knowing the training excitations it used and the corresponding responses through feeedback, the forward channel can be estimated.

In general, channel identification can be done either with or without training. A desirable channel identification algorithm should be robust to and operate in a variety of modem implementations. A preferable MIMO channel identification technique operates with embedded training inserted into the data stream by Training Symbol Injection block 20 in each burst. In this case, both data symbols and training symbols may be transmitted within a single burst. Furthermore, the channel can be determined in one burst, or filtering training data gathered over multiple bursts. Being able to update the channel estimates after every received burst makes the overall communication system robust to time variation in the channel. In addition, frequent channel estimates reduce the destructive effects of imperfect carrier frequency recovery. Since imperfect carrier recovery imparts a phase shift to the channel that continues to grow with time, shortening the time between channel estimation events keeps the channel estimation information from becoming "stale". Note, however, any of the well known blind channel estimation techniques can be used to determine the training symbol outputs as an alternative to using training. However, adaptive blind training is more prone to generating burst errors.

The parameters to be identified are the N MIMO spatial channel matrices. Hence, there are $N \cdot M_R \cdot M_T$ complex elements to be determined, $$H_{i,j}(n), \forall n \in [1,N], \forall i \in [1,M_R], \forall j \in [1,M_T].$$

By exploiting whatever correlation exists across the SOP bins, it may be possible to reduce the amount of overhead required to identify the channel. The amount of correlation that exists across SOP bins is determined by the specific implementation of the SOP. If the SOP implementation includes the IFFT-FFT pair, and the length of the FIR channel is time limited with v<<N, then a relatively large degree of correlation exists across the SOP bins.

In certain embodiments of the invention, the desired technique should identify the MIMO channel on a burst-by-burst basis, such as those with rapidly time-varying channels. This implies that training data should be included in every burst. If the throughput of information is to be maximized, the amount of training data in each burst should be minimized. It is therefore useful to determine the minimum amount of training data required, per burst, that allows full characterization of the channel by the receiver. It turns out that the minimum number of training symbols required to sufficiently excite the MIMO channel for estimation with an OFDM SOP is $M_T v$. To understand this result, consider the identification of a SISO channel, where each of the N values of the vector $H_{i,j}$ should be found. These N values are not independent since, $$H_{i,j} = Y \begin{bmatrix} h \\ 0 \end{bmatrix} = X \otimes^{-1} Z,$$

where X is a vector of all SOP bin outputs for antenna i, Z is a vector of bin inputs for antenna j, and h is a vector of the time-domain FIR channel from antenna j to antenna i. The matrix operator $\otimes^{-1}$ represents element by element divide. Since the time-domain channel is time limited to v samples, only v values of the transmitted symbols, Z, need to be training values. Furthermore, the identification of the SIMO channel only requires the same set of v transmitted training tones, since each SISO component in the SIMO channel is excited by the same input data. In a system embodiment with multiple inputs ($M_T$>1), identification of the MIMO channel requires the identification of $M_T$ separate SIMO channels. Hence, only $M_T v$ training symbols are needed to sufficiently excite the MIMO channel for channel identification.

MIMO Identification

The identification of the MIMO channel is accomplished by separately exciting each of the transmit antennas that will be used for communication. This decomposes the MIMO identification problem into $M_T$ SIMO identification problems. In order to accomplish channel identification in a single burst, $M_T$ mutually exclusive sets of v bins are selected from the N available bins to carry training symbols. Each transmitter antenna carries training symbols in a unique one of the $M_T$ sets of bins, while transmitting no energy in the bins contained in the union of the remaining $M_T-1$ sets of v bins. This is accomplished by choosing the TSWs 210A-C that correspond to training bins such that a single entry in the vector is "1" and the remaining entries equal to "0". It is the $j^{th}$ entry of a TSW that is set equal to "1" for those training symbols which are to be transmitted from the $j^{th}$ antenna. For example, say that symbol bin n=2 is one of the training bins associated with transmit antenna 3. Then, $$TSW(2,1)=[0\ 0\ 1\ 0\ \ldots\ 0]^T, \text{ and } TSW(2,m)=0 \text{ for } \forall m \neq 1,$$

and the corresponding training symbol z(2,1). By examining the contents of each set of training bins separately, the MIMO channel response is determined by finding $M_T$ independent SIMO channel responses.

In embodiments in which rapid updates of the channel estimate is not required, another exemplary training scheme may be employed. This training scheme involves using just one set of v training bins. On a given burst, one of the transmit antennas sends training symbols in the training bins and the other antennas transmit no energy in those bins. This allows the receiver to identify one of the $M_T$ SIMO channels. On the next burst, a different antenna sends training symbols in the training bins while the other antennas transmit no energy in those same bins. The receiver is then able to identify another set of N SIMO channels. This procedure is repeated until training data has been sent by each of the transmit antennas, allowing the entire MIMO channel to be identified. The entire procedure is repeated continuously so that full channel is determined every $M_T$ bursts.

SIMO Channel Identification

We have just shown that identification of the MIMO channel can be accomplished by successive identification of each SIMO channel. It is therefore useful to discuss specific techniques for obtaining a SIMO channel response. The following discussion assumes that the SOP is the IFFT-FFT pair. Channel identification techniques for other SOPs that exploit frequency and possibly time correlation in the similar fashion will be obvious to one skilled in the art.

It is assumed that a certain subset of available SOP bins are allocated for training. Let J be this set of frequency bins used for learning a SIMO channel. To begin, assume that J contains v bin indices. Furthermore, let $Z_i$ be the v training symbols and $X_{t,i}$ be the received data in the training frequency-bins from antenna i. Let the quantities $\hat{h}_i$, $\hat{H}_i$ be the estimated time-domain and frequency-domain channels from the transmit antenna under consideration to the receive antenna i. In other words, $\hat{h}_j$ is the v-length impulse response from the input under consideration to output i. Likewise, $\hat{H}_i$ is a vector of N frequency domain values for this channel. With these definitions, it can be shown that $$\hat{h}_i = Y_{j,\bar{v}}^{-1}(X_{t,i} \otimes)^{-1} Z_t), \qquad (81)$$

and $$\hat{H}_i = Y_{\bar{N},\bar{v}} \hat{h}_i. \qquad (82)$$

where, $$\bar{v} = \{1, 2, \ldots, v\},$$

$$\bar{N} = \{1, 2, \ldots, N\},$$

and $$Y_{PQ} = \frac{1}{\sqrt{N}} e^{-j2\pi pq/N}, \forall p \in \{P\}, \forall q \in \{Q\}.$$

This also generalizes to any number of training tones, γ, in which case the set J includes γ bin indices. When γ≧v, the frequency domain channel can be determined by, $$\hat{H}_i = Y_{\bar{N},\bar{v}} (Y_{j,\bar{v}}^H Y_{j,\bar{v}})^{-1} Y_{j,\bar{v}}^H (X_{t,i} \otimes)^{-1} Z_t).$$

Note that many of the above calculations can be performed in advance if the training bins are predetermined and fixed. Then, the matrix $Y_{\bar{N},\bar{v}}(Y_{\bar{v}},\Gamma Y_{\bar{v}},\Gamma)^{-1} Y_{\bar{v}},\Gamma^H$ can be computed and stored.

Note that there is no requirement that the training symbols always reside in the same bins from burst to burst. As long as the transmitter and receiver both know where the training symbols are placed in any given burst, the training bins may be varied from one burst to the next. This may be useful to characterize the nature of colored (across SOP bins) noise and/or interference are present.

A highly advantageous simplification of (83) can be done when v training symbols are placed in bins that are evenly spaced throughout the burst. In other words, $$J = \left\{0, \frac{N}{v}, \frac{2N}{v}, \ldots, \frac{(v-1)N}{v}\right\}.$$

In this case $Y_{j,\bar{v}}^{-1}$ is equal to the v-point IFFT matrix so that equation (81) represents the execution of an v-point IFFT. One may then obtain $\hat{H}_i$ in equation (82) by performing an N-point FFT on a vector consisting of $\hat{h}_i$ padded with N–v zeros. This approach to identifying $\hat{H}_i$ is only of computation order (N+v)log₂ v.

Identification over Multiple Bursts

Identification accuracy can be improved by either increasing the number of training symbols within each burst or by averaging over multiple bursts if the channel is correlated from one burst to another. Some degree of time domain correlation exists in the channel because the Doppler frequency shifts caused by moving objects in the physical environment are band-limited. This time correlation can be exploited by recursively filtering the estimated channel from the present burst with channel estimates from previous bursts. A general filtering approach is represented by $$\tilde{h}(k+1) = F(k)\tilde{h}(k) + G(k)\hat{h}(k)$$

where $\tilde{h}$ is the smoothed channel estimate of $\hat{h}$ over bursts k. The particular recursive filter weights F(k) and G(k) can be derived in a number of fashions. Two exemplary filtering methods are given in the following. The first approach determines a time-invariant FIR filter for each element of h based on a MMSE cost function. The second design is time-varying Kalman filter.

A particularly simple, yet effective, filter design technique is the determination of a time-invariant FIR filter, w, that minimizes the MMSE between the true channel impulse response and the filtered estimate. This design approach is referred to as Wiener filtering. In this embodiment, independent fading is assumed on each element of the channel impulse response. Therefore, each element of h can be considered independently. An FIR filter produces a filtered estimate by forming a weighted sum of the previous p+1 estimates for that particular impulse response element, $$\tilde{h}_i(k) = w^H \begin{bmatrix} \hat{h}_i(k) \\ \vdots \\ \hat{h}_i(k-p) \end{bmatrix}, \forall i = 1, 2, \ldots, v.$$

Using v such identical filters for each element of the impulse response, then the filtered estimate is given by $\tilde{h}(k) = [\tilde{h}_1(k) \ldots \tilde{h}_v(k)]^T$. The Wiener filter solution for w satisfies the following equation, $$\min_w E\left(|w^H \hat{h}_i(k) - h_i(k)|^2\right) = \min_w E\left(\left\|w^H \begin{bmatrix} \hat{h}_i(k) \\ \vdots \\ \hat{h}_i(k-p) \end{bmatrix} - h_i(k)\right\|^2\right).$$

The solution for the above optimization problem is given by, $$w = [E(\bar{h}_i(k)\bar{h}_i(k)^H)]^{-1} E[\bar{h}_i(k) h_i(k)] = R_{\hat{h}_i}^{-1} R_{\hat{h}_i h_i}.$$

If each delay in the channel impulse response undergoes Raleigh fading is assumed then, $$R_{\hat{h}_i} = \sigma_h^2 \begin{bmatrix} J_o(0) & J_o(\omega(N+v)T) & \cdots & J_o(\omega(N+v)T) \\ J_o(\omega(N+v)T) & \ddots & & \vdots \\ \vdots & & \ddots & \\ J_o(\omega p(N+v)T) & \cdots & & J_o(0) \end{bmatrix} + \sigma_e^2 I$$

and $$R_{\hat{h},h} = \sigma_h^2 \begin{bmatrix} J_o(0) \\ J_o(\omega(N+v)T) \\ \vdots \\ J_o(\omega p(N+v)T) \end{bmatrix},$$

where T is the sampling rate, ω is the maximum Doppler frequency, and $J_0$ is the zeroth-order Bessel function. The quantities $\sigma_h^2$ and $\sigma_c^2$ are the average channel power and the channel estimation noise power, respectively.

This filtering approach has many advantages. First, it is computationally simple. Each coefficient of the channel impulse response is filtered independently with a constant precomputed FIR weighting. Second, the underlying time-correlation in the multipath fading channel is efficiently exploited. Third, the exact values used for the filter are optimal in a MMSE sense.

A more generalized time-varying filtering approach is now developed based on the Kalman filtering equations. A general model for the time-correlated nature of the channel impulse response is given by the following set of equations, $$f(k+1)=Af(k)+q(k)$$

$$\hat{h}(k)=Cf(k)+r(k)$$

where the q and r represent noises with covariances Q and R, respectively. The matrices A,C,Q,R are used to define the particular model for the correlation of the impulse response over bursts. Note that the vector ĥ can also include the impluse response coefficients for more than one receive antenna. In this case, the above model can include both time correlation and correlation across space.

In a multi-access scheme, successive channel identifications may occur at an irregular rate. In this case, this Kalman filter approach is particularly useful since the filtering can be done with measurement updates and time updates, $$\hat{f}(k+1)=A(I-L(k)C)\hat{f}(k)+AL(k)\hat{h}(k)$$

$$L(k)=\hat{P}(k)C_H(C\hat{P}(k)C^H+R)^{-1}$$

$$\hat{P}(k)=A(I-L(k)C)\hat{P}(k)A^H+Q$$

$$\hat{h}(k)=C\hat{f}(k)$$

where L(k)=0 when the receiver is not receiving data in the present burst.

Interference Subspace Identification

For many of the spatial processing techniques embodied in this invention, the operation of the TSP and RSP can depend, in part, on the level of interference present in the wireless environment within which the invention operates. More specifically, it may be preferable to reduce the amount of interference contributed to other receivers by a judicious choice of the TSWs. It may also be preferable to improve the signal quality at the receiver by using RSWs that reject interference. In these cases, some quantitative measure of the interference across space and frequency is needed.

One preferable measure of the interference present is the so-called interference spatial covariance matrix, which describes interference correlation across space for each frequency bin, $$R_I(n)=E[I(n)I(n)^H], \quad (1)$$

where $x_I(n)$ represents an $M_R$-length received vector of signals from the interfering transmitter(s). To be more precise, $R_I(n)$ describes the interference and noise correlation across space for each frequency bin. Since we assume that the noise at the output of each receiver antenna path is additive thermal noise, and therefore that the additive noise is uncorrelated between any two antenna outputs, the noise contribution to $R_I(n)$ is non-zero only on the matrix diagonal. In environments dominated by interference, i.e. the interference power at the receiver is much stronger than the additive receiver noise, the noise contribution to $R_I(n)$ can be neglected. The interference covariance matrix contains information about the average spatial behavior of the interference. The eigenvectors of this matrix define the average spatial directions (in $M_R$-space) occupied by the interference. The eigenvalues of the matrix indicate the average power occupied by the interference in each the eigendirection. The eigendirections that are associated with large eigenvalues indicate spatial directions that receive a large amount of average interference power. The eigendirections associated with small eigenvalues indicate spatial directions that are preferable in that they receive less average interference power.

Identifying the receive covariance matrix, $R_I(n)$, is required for finding preferable RSPs. An analogous transmit covariance matrix is required for finding preferable TSPs. Notice that we've defined $R_I(n)$ in terms of received signal samples in Equation (1). Since the received signal samples are not usually available at the transmitter, it is preferable to derive the transmit covariance matrix from the receive covariance matrix. In time division duplex (TDD) systems, the receive and transmit covariance matrices are substantially equal when the time between reception and transmission is short relative to the rate of time variation in the channel. In frequency division duplex (FDD) Systems, the transmit and receive channel values are generally not correlated with one another at any given instant in time. However, the transmit and receive covariance matrices are substantially equal in FDD systems when sufficient time averaging is used in the calculation of $R_I$. There are many techniques for determining the interference covariance matrix, two of which are discussed below.

One interference characterization approach simply averages the received antenna signals during time periods in which the desired transceiver is not transmitting information. Since there is no desired signal arriving at the receiver, the interference (and noise) covariance is precisely equal to the measured sample covariance matrix, $$\hat{R}_I(n)=\hat{R}_x(n)=\frac{1}{k_2-k_1}\sum_{j=k_1}^{k_2}x(n,j)x(n,j)^H.$$

In TDD systems, one can make use of "dead-time" to collect samples from the receiver during which time no energy from the transmitting end arrives at the receiver. The "dead-time" is approximately equal to the round trip propagation delay between the to ends of the wireless communications link, and occurs when a transceiver switches from transmission mode to reception mode. In the above equation, $k_1$ and $k_2$ are the burst indexes corresponding to the first and last bursts received during the dead time. Thus, the interference covariance can be estimated with no increase in overhead.

The interference covariance matrices can also be determined while the desired signal is being transmitted to the receiver. One approach involves first determining the interference signal and subsequently finding the interference signal covariance. The estimated received interference is formed by subtracting the estimated desired signal from the total received signal, $$\hat{I}(n,k)=x(n,k)-\hat{H}(n,k)\hat{z}(n,k).$$

Therefore, once the channel is identified and the information symbols determined, the remaining signal is considered to be interference. The interference covariance matrix for bin n, averaged over K bursts is given by, $$R_I(n,k)=\frac{1}{K}\sum_{j=k-K+1}^{k}\hat{I}(n,k)\hat{I}(n,k)^H.$$

It is understood that when estimating the covariance matrix, it may be desirable to filter the covariance matrix estimates. It may also be advantageous in certain embodiments to determine an average interference covariance matrix across SOP bins. For example, within a multiple access system bursts may only be received occasionally, making it difficult to acquire a sufficient number of bursts with which to form an accurate covariance matrix for each bin. So instead of averaging over time (a series of received bursts), a covariance matrix is formed by averaging over the SOP bins of a single burst, $$R_I(k) = \frac{1}{N} \sum_{n=1}^{N} \hat{I}(n,k)\hat{I}(n,k)^H.$$

It may also be preferable to estimate the interference covariance matrices in an alternate frequency band. This can be done using the "dead-time" approach given above. This may be advantageous when the transceiver has the capability of choosing alternate frequency bands for communicating. Estimates of interference in alternate bands provides the foundation for an adaptive frequency hopped scheme.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, much of the above discussion concerns signal processing in the context of a wireless communication system where multiple inputs or multiple outputs are accessed by multiple transmitter antenna elements or multiple receiver antenna elements. However, the present invention is also useful in the context of wireline channels accessible via multiple inputs or multiple outputs.

What is claimed is:

1. A method for transmitting into a channel via a plurality of antenna elements, said method comprising:

for each of a plurality of orthogonal frequency subchannels, establishing a plurality of spatial subchannels for communication from a transmitter to a receiver, each spatial subchannel defined by one or more weights among said plurality of antenna elements;

for at least one of said orthogonal frequency subchannels, distributing information among said plurality of spatial subchannels in accordance with spatial subchannel quality; and for said at least one of said orthogonal frequency subchannels, transmitting said information via said plurality of spatial subchannels by employing said plurality of antenna elements.

2. The method of claim 1 wherein said spatial subchannels are orthogonal.

3. The method of claim 1 wherein distributing comprises: trellis encoding said information.

4. The method of claim 1 wherein establishing comprises: selecting weights based on a zero-forcing (ZF) procedure.

5. The method of claim 1 wherein establishing comprises: selecting weights based on a minimum mean square error procedure.

6. The method of claim 1 wherein said weights are selected to minimize interference to unintended receivers.

7. A method for receiving from a channel via a plurality of antenna elements, said method comprising:

receiving signals via said plurality of antenna elements;

frequency domain processing the received signals to recover orthogonal frequency subchannel information;

spatially processing said orthogonal frequency subchannel information to separate received information into a plurality of spatial subchannels, each spatial subchannel defined by one or more weights among said plurality of antenna elements; and decoding said received information in accordance with an encoding scheme that is optimized to take advantage of multiple spatial subchannels.

8. The method of claim 7 wherein said spatial subchannels are orthogonal.

9. The method of claim 7 wherein said encoding scheme comprises a trellis coding scheme.

10. The method of claim 7 wherein spatially processing comprises selecting weights in accordance with a zero forcing procedure.

11. The method of claim 7 wherein spatially processing comprises selecting weights in accordance with a minimum mean square error procedure.

12. Apparatus for receiving from a channel via a plurality of antenna elements, said apparatus comprising:

a demodulation and RF system that receives signals via said plurality of antenna elements;

a frequency domain processor that recovers orthogonal frequency subchannel information from said signals;

a spatial processor that processes said orthogonal frequency subchannel information to separate received information into a plurality of spatial subchannels, each spatial subchannel defined by one or more weights among said plurality of antenna elements; and a decoder that decodes said received information in accordance with an encoding scheme that is optimized to take advantage of multiple spatial subchannels.

13. The apparatus of claim 12 wherein said spatial subchannels are orthogonal.

14. The apparatus of claim 12 wherein said decoder comprises a trellis decoder.

15. The apparatus of claim 12 wherein said spatial processor assigns weights in accordance with a zero forcing procedure.

16. The apparatus of claim 12 wherein said spatial processor selects weights in accordance with a minimum mean square error procedure.

17. Apparatus for receiving from a channel via a plurality of antenna elements, said apparatus comprising:

means for receiving signals via said plurality of antenna elements;

means for frequency domain processing the received signals to recover orthogonal frequency subchannel information;

means for spatially processing said orthogonal frequency subchannel information to separate received information into a plurality of spatial subchannels, each spatial subchannel defined by one or more weights among said plurality of antenna elements; and means for decoding said received information in accordance with an encoding scheme that is optimized to take advantage of multiple spatial subchannels.

18. The apparatus of claim 17 wherein said spatial subchannels are orthogonal.

19. The apparatus of claim 17 wherein said means for decoding comprises a trellis decoder.

20. The apparatus of claim 17 wherein said means for spatially processing comprises means for selecting weights in accordance with a zero forcing procedure.

21. The apparatus of claim 17 wherein said means for spatially processing comprises means for selecting weights in accordance with a minimum mean square error procedure.

* * * * *

UNITED STATES PATENT AND TRADEMARK OFFICE
CERTIFICATE OF CORRECTION

PATENT NO. : 6,888,899 B2
APPLICATION NO. : 10/172373
DATED : May 3, 2005
INVENTOR(S) : Raleigh et al.

It is certified that error appears in the above-identified patent and that said Letters Patent is hereby corrected as shown below:

Title page, Item (57) abstract, line 4, kindly change "antenna element" to --antenna elements--.

Figure 16:
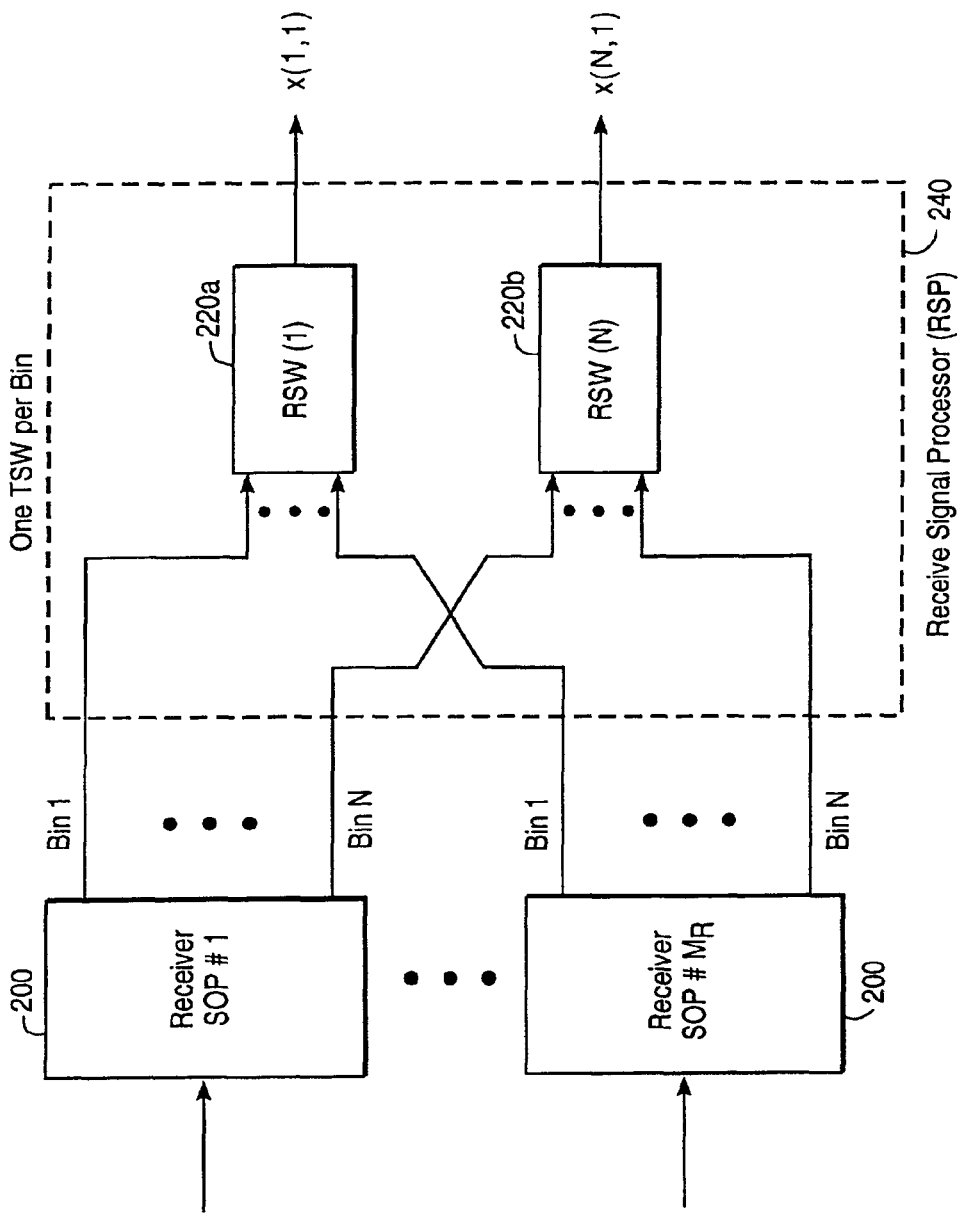
FIG. 16 depicts the use of a single spatial direction at the receiver end for each bin of an SOP according to one embodiment of the present invention.

In the drawings, Sheet 16, FIG. 16, for unit 240, kindly change "One TSW per Bin" to --One RSW per Bin--.

In the drawings, Sheet 24, FIG. 24, in the block having reference numeral 300, the annotation "Symbol Sequence Demodulator" should be changed to --Symbol Sequence Demultiplexor--.

In columns 1-2, kindly delete the section entitiled SUMMARY OF THE INVENTION that goes from column 1, line 64 through column 2, line 32.

In column 13, after line 51 kindly replace Eq. (1) with:

$$G(k) = \begin{bmatrix} G_{1,1}(k) & \cdots & G_{1,M_T}(k) \\ \vdots & \ddots & \vdots \\ G_{M_R,1}(k) & \cdots & G_{M_R,M_T}(k) \end{bmatrix} \in C^{NM_T \times (N+v)M_R}. \quad (1)$$

In column 18, line 35, kindly change "sane bin" to --same bin--.

In column 22, line 6, kindly change "tern" to --term--.

In column 33, line 29, kindly change "matrix $Y_{\bar{N},\bar{v}}(Y_{\bar{v},r}Y_{\bar{v},r})^{-1}Y_{\bar{v},r}^H$ can" to --matrix $Y_{\bar{N},\bar{v}}(Y_{\bar{v},r}^H Y_{\bar{v},r})^{-1}Y_{\bar{v},r}^H$ can--.

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,888,899 B2
APPLICATION NO. : 10/172373
DATED : May 3, 2005
INVENTOR(S) : Raleigh et al.

It is certified that error appears in the above-identified patent and that said Letters Patent is hereby corrected as shown below:

Title page, Item (57) abstract, line 4, kindly change "antenna element" to --antenna elements--.

In the drawings, Sheet 16, FIG. 16, for unit 240, kindly change "One TSW per Bin" to --One RSW per Bin--.

In the drawings, Sheet 24, FIG. 24, in the block having reference numeral 300, the annotation "Symbol Sequence Demodulator" should be changed to --Symbol Sequence Demultiplexor--.

In columns 1-2, kindly delete the section entitled SUMMARY OF THE INVENTION that goes from column 1, line 64 through column 2, line 32.

In column 13, after line 51 kindly replace Eq. (1) with:

$$G(k) = \begin{bmatrix} G_{1,1}(k) & \cdots & G_{1,M_T}(k) \\ \vdots & \ddots & \vdots \\ G_{M_R,1}(k) & \cdots & G_{M_R,M_T}(k) \end{bmatrix} \in C^{NM_T \times (N+v)M_R}. \quad (1)$$

In column 18, line 35, kindly change "sane bin" to --same bin--.

In column 22, line 6, kindly change "tern" to --term--.

UNITED STATES PATENT AND TRADEMARK OFFICE
CERTIFICATE OF CORRECTION

PATENT NO. : 6,888,899 B2
APPLICATION NO. : 10/172373
DATED : May 3, 2005
INVENTOR(S) : Raleigh et al.

It is certified that error appears in the above-identified patent and that said Letters Patent is hereby corrected as shown below:

In column 33, line 29, kindly change the equation after "the matrix" from

" $Y_{\overline{N},\overline{V}}(Y_{\overline{V},}\Gamma Y_{\overline{V},}\Gamma)^{-1}Y_{\overline{V},}\Gamma^{H}$ " to -- $Y_{\overline{N},\overline{V}}(Y_{J,\overline{V}}^{H}Y_{J,\overline{V}})^{-1}Y_{J,\overline{V}}^{H}$ --.

This certificate supersedes the Certificate of Correction issued October 17, 2006.

Signed and Sealed this

Seventeenth Day of March, 2009

JOHN DOLL
*Acting Director of the United States Patent and Trademark Office*